United States Patent
Komori

(10) Patent No.: US 8,096,202 B2
(45) Date of Patent: Jan. 17, 2012

(54) TRANSMISSION AND GEAR CHANGING METHOD

(75) Inventor: Masaharu Komori, Kyoto (JP)

(73) Assignee: Kyoto University, Kyoto (JP)

( * ) Notice: Subject to any disclaimer, the term of this patent is extended or adjusted under 35 U.S.C. 154(b) by 457 days.

(21) Appl. No.: 12/312,512

(22) PCT Filed: Nov. 15, 2007

(86) PCT No.: PCT/JP2007/072215
§ 371 (c)(1),
(2), (4) Date: May 14, 2009

(87) PCT Pub. No.: WO2008/062718
PCT Pub. Date: May 29, 2008

(65) Prior Publication Data
US 2010/0064848 A1    Mar. 18, 2010

(30) Foreign Application Priority Data
Nov. 22, 2006    (JP) ................................. 2006-316164

(51) Int. Cl.
*F16H 3/08* (2006.01)
(52) U.S. Cl. .......................................................... 74/325
(58) Field of Classification Search ........................ None
See application file for complete search history.

(56) References Cited

U.S. PATENT DOCUMENTS

| | | | |
|---|---|---|---|
| 2,181,210 A * | 11/1939 | Sieg | ................. 74/325 |
| 2,239,313 A | 4/1941 | Beschkine | |
| 4,050,324 A | 9/1977 | Teyssandier | |
| 4,765,195 A | 8/1988 | Takami | |
| 7,188,719 B2 * | 3/2007 | Kerr | ................. 192/65 |

FOREIGN PATENT DOCUMENTS

| | | |
|---|---|---|
| JP | U-S52-110276 | 8/1977 |
| JP | U-S58-93409 | 6/1983 |
| JP | U-H03-46046 | 4/1991 |
| JP | H03-134348 | 6/1991 |
| JP | H07-217709 | 8/1995 |
| JP | 2001-146964 | 5/2001 |
| JP | 2006-046426 | 2/2006 |

OTHER PUBLICATIONS

JSMA Mechanical Engineers' Handbook, Design, β4: Machine Elements and Tribology, Publication Date: Oct. 25, 2005, pp. β4-82~β4-83.

* cited by examiner

*Primary Examiner* — Dirk Wright
(74) *Attorney, Agent, or Firm* — Manabu Kanesaka

(57) ABSTRACT

A transmission and a gear changing method capable of changing a reduction ratio while a load is supported without stopping rotation, and transmitting a rotation angle accurately and power efficiently.

First and second gear element pairs (16, 17) are arranged between an input member (12) and an output member (14) via first and second clutches (40, 42), and a non-circular gear pair (18) is arranged via a non-circular gear element pair-use clutch (44). The non-circular gear pair (18) includes between the input member (12) and the output member (14) a first meshing section where it has a ratio equal to a first reduction ratio when the first gear element pair (16) is coupled, and a second meshing section where it has a ratio equal to a second reduction ratio when the second gear element pair (17) is coupled. When the gear element pairs (16, 17) to be coupled between the input member (12) and the output member (14) are switched, the non-circular gear element pair (18) is coupled between the input member (12) and the output member (14) transitionally.

12 Claims, 11 Drawing Sheets

(a)

(b)

(c)

(d)

(e)

TRANSMISSION AND GEAR CHANGING METHOD

TECHNICAL FIELD

The present invention relates to a transmission and a gear changing method, and in particular, to a transmission and a gear changing method to switch a reduction ratio. Note that, in this specification, the term "reduction ratio" is expressed as a driving side rotation speed/a driven side rotation speed (or an input side rotation speed/an output side rotation speed), and when a driven side rotation speed is lower than a driving side rotation speed (in a case of so-called speed reduction), a reduction ratio becomes a value greater than 1. The term "reduction ratio" is expressed by use of the same definition even in a case in which a driven side rotation speed is higher than a driving side rotation speed (in a case of so-called speed-up), and in this case, a reduction ratio becomes a value less than 1.

BACKGROUND ART

Recently, large numbers of transmissions, for example, such an automatic transmissions for vehicles, which are capable of changing a reduction ratio in a multistep manner have already been developed, which are becoming established machines (for example, refer to Patent Document 1 and Non-Patent Document 1).

Patent Document 1: Japanese Published Unexamined Patent Application No. 2001-146964

Non-Patent Document 1: Edited by the Japan Society of Mechanical Engineers, "Mechanical Engineering Handbook, Design, β4: Machine Elements and Tribology," First edition, published by the Japan Society of Mechanical Engineers, on 25 Oct. 2005, p. 83.

DISCLOSURE OF THE INVENTION

Problems to be Solved by the Invention

Currently, the great majority of robots are driven by electric motors equipped with reduction gears with a constant reduction ratio. Those electric motors have the characteristic that the motor rotates at a low speed at high torque and rotates at a high speed at low torque, and its responsive range is narrow. Further, when a reduction ratio is constant, because a higher reduction ratio is normally selected in order to be able to work even in the maximum loaded condition, a speed is limited even with no load, which brings about the problem that working efficiency is decreased. Therefore, in order to drive a motor efficiently in a broad speed range, a transmission capable of changing a reduction ratio as necessary is required.

In a robot, it is required to change a reduction ratio in a loaded condition, and it is necessary to continue supporting a load even in the process of changing a reduction ratio. Moreover, because it is necessary to perform work at a high degree of accuracy, it is required to transmit a rotation angle accurately even when changing a reduction ratio. Further, it is required to change a reduction ratio without stopping rotation.

On the other hand, transmissions have already been used for automobiles and bicycles. However, there has been the problem that power is efficiently transmitted when changing a reduction ratio.

Normally, because it is impossible to make gear pairs having different reduction ratios mesh with each other to rotate simultaneously, it is impossible to change a reduction ratio while a load is supported without stopping rotation. Further, in normal transmissions for automobiles etc., before changing a reduction ratio, rotation speeds of a gear and an axle to be tightened, having different rotation speeds, are matched to one another by utilizing friction. Therefore, great slipping is caused between the gear and the axle, which makes it difficult to transmit a rotation angle accurately, which results in inefficiency in power transmission.

The present invention has been achieved in consideration of such circumstances, and an object of the present invention is to provide a transmission and a gear changing method capable of changing a reduction ratio while a load is supported without stopping rotation, and transmitting a rotation angle accurately and transmitting power efficiently.

Means for Solving the Problems

In order to solve the above-described technical problems, the present invention provides a transmission configured as follows.

A transmission includes a first gear element pair and a second gear element pair which are at least two sets of gear element pairs, the first gear element pair and the second gear element pair are respectively arranged between an input member and an output member supported rotatably, and a first clutch and a second clutch which are at least two sets of clutches, the first clutch and the second clutch respectively couple at least two sets of the gear element pairs releasably between the input member and the output member. The transmission includes at least one set of a non-circular gear element pair which is arranged between the input member and the output member, and at least one set of a non-circular gear element pair-use clutch that couples at least one set of the non-circular gear element pair releasably between the input member and the output member. In the transmission, the non-circular gear element pair includes (a) a first meshing section in which a reduction ratio between the input member and the output member becomes equal to a first reduction ratio in at least a partial meshing section of the first gear element pair when the first gear element pair is coupled between the input member and the output member, and (b) a second meshing section in which a reduction ratio between the input member and the output member becomes equal to a second reduction ratio in at least a partial meshing section of the second gear element pair when the second gear element pair is coupled between the input member and the output member.

In this transmission, a reduction ratio between the input member and the output member is changed due to, for example, (1) in a state in which the first (or second) clutch couples the first (or second) gear element pair between the input member and the output member, to mesh together at the first (or second) reduction ratio, when the non-circular gear element pair meshes together in the first (or second) meshing section, the non-circular gear element pair-use clutch couples the non-circular gear element pair between the input member and the output member, (2) next, while the first (or second) gear element pair continues meshing together at the first (or second) reduction ratio, and while the non-circular gear element pair continues meshing together in the first (or second) meshing section, the first (or second) clutch releases the coupling of the first (or second) gear element pair, (3) next, in a state in which the non-circular gear element pair meshes together in the second (or first) meshing section, and in a state in which the second (or first) gear element pair meshes together at the second (or first) reduction ratio, the second (or first) clutch couples the second (or first) gear element pair between the input member and the output member, and (4) next, while the non-circular gear element pair continues meshing together in the second (or first) meshing section, and while the second (or first) gear element pair continues meshing together at the second (or first) reduction ratio, the non-circular gear element pair-use clutch releases the coupling of the non-circular gear element pair.

In the above-described configuration, if the respective reduction ratios are the same when the gear element pair and the non-circular gear element pair are simultaneously coupled between the input member and the output member, it is possible to switch the gear element pair to be coupled between the input member and the output member while a load is supported without stopping rotation. Therefore, the respective reduction ratios when the gear element pair and the non-circular gear element pair are simultaneously coupled between the input member and the output member may be changed synchronously. That is, the first reduction ratio and the second reduction ratio may not be necessarily constant.

According to the above-described configuration, provided that the non-circular gear element pair is to be transitionally coupled between the input member and the output member when switching a state at the first (or second) reduction ratio at which the first (or second) gear element pair is coupled between the input member and the output member and a state at the second (or first) reduction ratio at which the second (or first) gear element pair is coupled between the input member and the output member, it is possible to change a reduction ratio while a load is supported without stopping rotation, and to transmit a rotation angle accurately and transmit power efficiently.

Note that, in the present invention, the term "gear elements" broadly means elements having teeth, that include not only gears, but also sprockets, pulleys, and the like. The term "gear element pairs" is not limited to a case in which teeth of gear elements directly mesh with each other, but also to a case in which teeth of gear elements indirectly mesh with each other to be interlocked via intermediate gears, synchronous belts, chains, and the like. The term "gear element pair" may also be composed of, not only spur gears, helical gears, herring-bone gears, or sprockets, but also bevel gears, internally-toothed gears, a planetary gear drive, or the like. When the "gear element pair" is composed of a planetary gear drive, any one of a sun gear, an internally-toothed gear, and a carrier may be fixed, and a rotation of an input member may be transmitted to another one, and a rotation of the other one may be transmitted to an output member.

According to a preferred aspect, the transmission includes at least three sets of the gear element pairs, at least three sets of the clutches, at least two sets of the non-circular gear element pairs, and at least two sets of the non-circular gear element pair-use clutches.

In this case, for example, a reduction ratio between the input member and the output member can be set to three or more stages (for example, a low reduction ratio, a medium reduction ratio, and a high reduction ratio) by the three or more sets of the gear element pairs, and it is possible to smoothly switch a reduction ratio by use of at least two sets of the non-circular gear element pairs. For example, the transmission is configured such that, when the input member rotates in a certain rotation direction, the first non-circular gear element pair has meshing sections at the low reduction ratio, the medium reduction ratio, and the high reduction ratio in this order, and repeats changing a reduction ratio in this order, and the second non-circular gear element pair has meshing sections at the high reduction ratio, the medium reduction ratio, and the low reduction ratio in this order, and repeats changing a reduction ratio in this order, and the first non-circular gear element pair is used when a reduction ratio is changed from the low reduction ratio to the medium reduction ratio, and from the medium reduction ratio to the high reduction ratio, and the second non-circular gear element pair is used when a reduction ratio is changed from the high reduction ratio to the medium reduction ratio, and from the medium reduction ratio to the low reduction ratio. Or, the transmission is configured such that the first non-circular gear element pair has meshing sections in which a reduction ratio becomes the low reduction ratio and the medium reduction ratio, and the second non-circular gear element pair has meshing sections in which a reduction ratio becomes the high reduction ratio and the medium reduction ratio, and the first non-circular gear element pair is used when a reduction ratio is changed from the low reduction ratio to the medium reduction ratio, and from the medium reduction ratio to the low reduction ratio, and the second non-circular gear element pair is used when a reduction ratio is changed from the high reduction ratio to the medium reduction ratio, and from the medium reduction ratio to the high reduction ratio.

It is preferable in the transmission that, circular gear elements of the gear element pair mesh with one another.

In this case, the configuration is simplified as compared with a case in which a reduction ratio when the gear element pair is coupled between the input member and the output member changes, i.e., a case in which the gear element pair is composed of non-circular gear elements, and it is also easy to switch the reduction ratio between the input member and the output member.

It is preferable in the transmission that, one of the gear elements of the gear element pair is supported to be in a relatively rotatable state by one of the input member and the output member, and the other one of the gear elements of the gear element pair is fixed not to be in a relatively rotatable state to the other one of the input member and the output member. The clutch connects one of the gear elements of the gear element pair releasably to one of the input member and the output member. One of the non-circular gear elements of the non-circular gear element pair is supported to be in a relatively rotatable state by one of the input member and the output member. The other one of the non-circular gear elements of the non-circular gear element pair is fixed not to be in a relatively rotatable state to the other one of the input member and the output member at least when the gear element pair coupled between the input member and the output member is switched. The non-circular gear element pair-use clutch connects at least one of the non-circular gear elements of the non-circular gear element pair releasably to one of the input member and the output member. At least one of the clutch and the non-circular gear element pair-use clutch is a meshing clutch.

When the first (or second) gear element pair is coupled at the first (or second) reduction ratio between the input member and the output member, even if the non-circular gear element pair is not coupled between the input member and the output member, a reduction ratio thereof becomes the first (or second) reduction ratio in the first (or second) meshing section, and rotation speeds at the driving side and the driven side of the non-circular gear element pair-use clutch are made equal to one another. When the non-circular gear element pair is coupled between the input member and the output member to mesh together in the first (or second) meshing section, even if the first (or second) gear element pair is not coupled between the input member and the output member, the first (or second) gear element pair rotates at the first (or second) reduction ratio in at least a partial meshing section, and rotation speeds at the driving side and the driven side of the first (or second) clutch are made equal to one another. Accordingly, for example, meshing clutches such as dog clutches whose driving side and driven side axially come close to and separate from each other and the driving side and driven side mechanically mesh together, can be used as the clutch and the non-circular gear element pair-use clutch, which makes it possible not to cause slipping in clutches.

The transmission preferably further includes an actuator that respectively drives the clutch and the non-circular gear element pair-use clutch, and a control device that controls operations of the actuator.

In this case, it is possible to automate switching of a reduction ratio between the input member and the output member by the control device.

It is preferable in the transmission that slidingly-contact members are provided in parallel with the respective non-circular gear elements forming the non-circular gear element pair. The slidingly-contact members respectively rotate integrally with the respective non-circular gear elements, and outer circumferential surfaces thereof frictionally contact each other.

In this case, a free movement of the backlash between the non-circular gear elements is limited by the frictional contact of the outer circumferential surfaces of the slidingly-contact members to some extent. Thereby, it is possible to reduce vibration in the non-circular gear elements.

It is preferable in the transmission that the non-circular gear element pair-use clutch is capable of simultaneously releasing both of a connection between the input member and the non-circular gear element pair and a connection between the non-circular gear element pair and the output member.

In this case, by interrupting transmission of rotations from both of the input member and the output member to the non-circular gear element pair, in a case in which the non-circular gear element pair is not used, the rotation of the non-circular gear element pair is stopped, which makes it possible not to cause a vibration due to a rotation of the non-circular gear element pair.

Further, in order to solve the above-described problems, the present invention provides a gear changing method configured as follows.

A gear changing method is a gear changing method for changing a reduction ratio between an input member and an output member rotating. The gear changing method includes (1) a first step of coupling a non-circular gear element pair between the input member and the output member so as to simultaneously mesh with the first (or second) gear element pair at the first (or second) reduction ratio, in a state in which a first (or second) gear element pair meshing together at a first (or second) reduction ratio in at least a partial meshing section is coupled between the input member and the output member, (2) a second step of releasing the coupling of the first (or second) gear element pair between the input member and the output member while the non-circular gear element pair and the first (or second) gear element pair simultaneously continue meshing together at the first (or second) reduction ratio, (3) a third step of coupling a second (or first) gear element pair meshing together at the second (or first) reduction ratio in at least a partial meshing section so as to simultaneously mesh with the non-circular gear element pair at the second (or first) reduction ratio between the input member and the output member, in a state in which the non-circular gear element pair meshes together at the second (or first) reduction ratio, and (4) a fourth step of releasing the coupling of the non-circular gear element pair between the input member and the output member while the non-circular gear element pair and the second (or first) gear element pair simultaneously continue meshing together at the second (or first) reduction ratio.

According to the above-described method, provided that the non-circular gear element pair is to be transitionally coupled between the input member and the output member when switching a state at the first (or second) reduction ratio at which the first (or second) gear element pair is coupled between the input member and the output member and a state at the second (or first) reduction ratio at which the second (or first) gear element pair is coupled between the input member and the output member, it is possible to change a reduction ratio while a load is supported without stopping rotation, and to transmit a rotation angle accurately and transmit power efficiently.

Note that, if the respective reduction ratios are the same when the gear element pair and the non-circular gear element pair are simultaneously coupled between the input member and the output member, it is possible to switch the gear element pair to be coupled between the input member and the output member while a load is supported without stopping rotation. Therefore, the respective reduction ratios when the gear element pair and the non-circular gear element pair are simultaneously coupled between the input member and the output member may be changed synchronously. That is, the first reduction ratio and the second reduction ratio may not be necessarily constant.

The transmission preferably includes an input side speed-up and reduction gear device that connects so as to be capable of transmitting rotation between a first portion in the input member in which one of the gear elements of the gear element pair is arranged and a second portion in the input member in which one of the non-circular gear elements of the non-circular gear element pair is arranged, and an output side speed-up and reduction gear device that connects so as to be capable of transmitting rotation between a first portion in the output member in which the other one of the gear elements of the gear element pair is arranged and a second portion in the output member in which the other one of the non-circular gear elements of the non-circular gear element pair is arranged.

In the above-described configuration, a rotation of the first portion in the input member is reduced (or speeded up) by the input side speed-up and reduction gear device arranged between the first portion in the input member and the second portion in the input member, to be transmitted to the second portion in the input member at the side of the non-circular gear element pair. A rotation of the second portion in the input member is transmitted to the second portion in the output member via the non-circular gear element pair. A rotation of the second portion in the output member is speeded up (or reduced) by the output side speed-up and reduction gear device arranged between the second portion in the output member and the first portion in the output member, to be transmitted to the first portion in the output member at the side of the gear element pair.

In the above-described configuration, a time in which the non-circular gear element pair is coupled between the input member and the output member can be lengthened (or shortened) when switching the gear element pair coupled between the input member and the output member by the speed-up and reduction gear devices, and in accordance therewith, a time in which the clutch is operated can be lengthened (or shortened).

According to the above-described configuration, even when an input is at a high speed rotation, a time required for the operation of switching the clutches can be lengthened by making the rotations of the non-circular gear element pairs slower by the speed-up and reduction gear devices with appropriate reduction ratios, which makes it possible to easily change a reduction ratio. When an input is a low speed rotation, a time required for switching a reduction ratio can be shortened by making the rotations of the non-circular gear element pairs faster by the speed-up and reduction gear devices with appropriate reduction ratios.

It is preferable in the transmission that the clutch includes a one-way clutch.

In a case in which it is assumed that a rotation in a certain direction is a forward direction rotation, when the input side is going to rotate in the forward direction faster than the output side, a one-way clutch transmits the rotation at the input side to the output side. That is, the one-way clutch becomes an ON-state. On the other hand, when the input side rotates in the forward direction slower than the output side, the input side and the output side respectively rotate independently. That is, the one-way clutch becomes an OFF-state.

Provided that a one-way clutch is used, it is possible to automatically switch the clutch ON and OFF. Therefore, it is possible to simplify the clutch control.

It is preferable in the transmission that the clutch that couples the gear element pair having a maximum reduction ratio among the gear element pairs releasably between the input member and the output member is a one-way clutch.

In the above-described configuration, when a reduction ratio of the transmission is switched in a state in which the one-way clutch of the gear element pair having a maximum reduction ratio is in an ON-state, i.e., in a state in which a reduction ratio of the transmission is at a maximum, because the reduction ratio is decreased, the rotation of the output side is made faster than that of the input side of the one-way clutch, and the one-way clutch automatically becomes an OFF-state. In contrast thereto, in a case in which the reduction ratio of the transmission is maximized, the one-way clutch automatically becomes an ON-state at a stage at which the clutch for the non-circular gear element pair used for switching the rotation ratio is made to become an OFF-state.

According to the above-described configuration, because the clutch for the gear element pair having a maximum reduction ratio is automatically switched ON and OFF, it is possible to simplify the clutch control.

Further, the present invention provides a transmission configured as follows.

A transmission includes (a) a first gear element pair and a second gear element pair which are at least two sets of gear element pairs, the first gear element pair and the second gear element pair are respectively arranged between an input member and an output member supported rotatably, (b) a first clutch and a second clutch which are at least two sets of clutches, the first clutch and the second clutch respectively couple at least two sets of the gear element pairs releasably between the input member and the output member, (c) at least one set of a non-circular gear element pair which is arranged between the input member and the output member, (d) at least one set of a non-circular gear element pair-use clutch that couples at least one set of the non-circular gear element pair releasably between the input member and the output member, (e) an input side speed-up and reduction gear device that connects so as to be capable of transmitting rotation between a first portion in the input member in which one of the gear elements of the gear element pair is arranged and a second portion in the input member in which one of the non-circular gear elements of the non-circular gear element pair is arranged, and (f) an output side speed-up and reduction gear device that connects so as to be capable of transmitting rotation between a first portion in the output member in which the other one of the gear elements of the gear element pair is arranged and a second portion in the output member in which the other one of the non-circular gear elements of the non-circular gear element pair is arranged. The non-circular gear element pair includes a first meshing section in which a reduction ratio thereof becomes a first reduction ratio and a second meshing section in which a reduction ratio thereof becomes a second reduction ratio. A product of the first reduction ratio of the non-circular gear element pair, a reduction ratio of the input side speed-up and reduction gear device, and a reduction ratio of the output side speed-up and reduction gear device is equal to a reduction ratio in at least a partial meshing section of the first gear element pair when the first gear element pair is coupled between the input member and the output member. A product of the second reduction ratio of the non-circular gear element pair, a reduction ratio of the input side speed-up and reduction gear device, and a reduction ratio of the output side speed-up and reduction gear device is equal to a reduction ratio in at least a partial meshing section of the second gear element pair when the second gear element pair is coupled between the input member and the output member.

In the above-described configuration, a time in which the non-circular gear element pair is coupled between the input member and the output member can be lengthened (or shortened) when the gear element pair coupled between the input member and the output member is switched by the speed-up and reduction gear devices, and in accordance therewith, a time in which the clutch is operated can be lengthened (or shortened).

According to the above-described configuration, even when an input is at a high speed rotation, a time required for the operation of switching the clutches can be lengthened by making the rotations of the non-circular gear element pairs slower by the speed-up and reduction gear devices with appropriate reduction ratios, which makes it possible to easily change a reduction ratio. When an input is a low speed rotation, a time required for switching a reduction ratio can be shortened by making the rotations of the non-circular gear element pairs faster by the speed-up and reduction gear devices with appropriate reduction ratios.

Further, it is possible to improve design and selection freedom of the non-circular gear element pairs and the speed-up and reduction gear devices.

Effects of the Invention

According to the present invention, because it is possible to put the transmission into a state in which a gear element pair is always coupled between the input member and the output member by using the non-circular gear elements, when a reduction ratio between the input member and the output member is changed, it is possible to change a reduction ratio while a load is supported without stopping rotation, and transmitting a rotation angle accurately and transmitting power efficiently. Further, the structure of the transmission is simple, which makes it possible to make an attempt to reduce its size and weight, and achieve a low cost.

DESCRIPTION OF SYMBOLS

Figure 1:
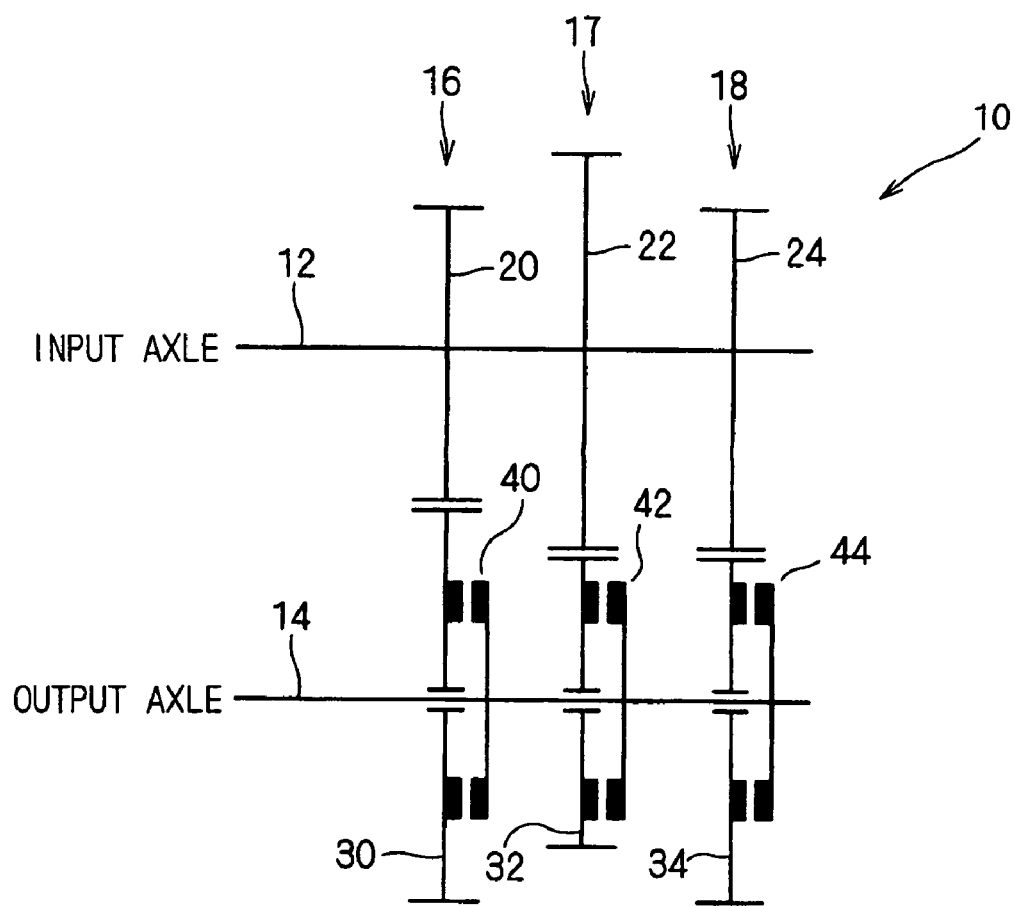
FIG. 1 is a structural chart schematically showing a configuration of a transmission. (Embodiment 1)

10: Transmission
12: Input axle (Input member)
14: Output axle (Output member)
16: First gear pair (First gear element pair)
17: Second gear pair (Second gear element pair)
18: Non-circular gear pair (Non-circular gear element pair)
20, 22, 24: Input side gear
25: First section (First meshing section)
26: Second section
27: Third section (Second meshing section)
28: Fourth section
30, 32, 34: Output side gear
35: First section (First meshing section)
36: Second section
37: Third section (Second meshing section)
38: Fourth section
40: Clutch (First clutch)
41: Shifter
42: Clutch (Second clutch)
44: Clutch (Non-circular gear element-use clutch)
45: Shifter
50, 50a: Transmission
52, 52a: Input axle (Input member)
52s: First portion in input axle (Input member)
52t: Second portion of input axle (Input member)
54, 54a: Output axle (Output member)
54s: First portion in output axle (Output member)
54t: Second portion in output axle (Output member)
55: First gear pair (Three sets of gear element pairs)
56: Second gear pair (Three sets of gear element pairs)
57: Third gear pair (Three sets of gear element pairs)
58: First non-circular gear pair (Two sets of non-circular gear element pairs)
59: Second non-circular gear pair (Two sets of non-circular gear element pairs)
69, 79: Speed-up and reduction gear device
80, 82, 84, 86, 88: Clutch
110: Transmission
144: Clutch (Non-circular gear element pair-use clutch)
500: Circular gear-use clutch (First clutch, Second clutch)
502: Non-circular gear-use clutch (Non-circular gear element pair-use clutch)

BEST MODE FOR CARRYING OUT THE INVENTION

Hereinafter, embodiments of the present invention will be described with reference to FIGS. 1 to 11.

Embodiment 1

Embodiment 1 will be described with reference to FIGS. 1 to 7.

First, a basic configuration of a transmission in Embodiment 1 will be described with reference to FIGS. 1 and 2.

As schematically shown in a structural chart of FIG. 1, a transmission 10 includes an input axle 12 and an output axle 14 which are supported rotatably, a first gear pair 16, a second gear pair 17, a non-circular gear pair 18, and clutches 40, 42, and 44.

In the respective gear pairs 16, 17, and 18, the pairs of gears 20 and 30, 22 and 32, and 24 and 34 respectively mesh together, and there is no delay in a rotation angle. That is, the respective gear pairs 16, 17, and 18 transmit a rotation angle accurately, and transmit power efficiently.

One of the gears (input side gears) 20, 22, and 24 of the respective gear pairs 16, 17, and 18 are fixed to the input axle 12, and these gears 20, 22, and 24 rotate integrally with the input axle 12.

The other of the gears (output side gears) 30, 32, and 34 of the respective gear pairs 16, 17, and 18 are supported to be in a relatively rotatable state by the output axle 14. The output side gears 30, 32, and 34 are selectively connected to the output axle 14 with the clutches 40, 42, and 44. That is, when the clutches 40, 42, and 44 are engaged, that is, in an ON-state, the corresponding output side gears 30, 32, and 34 are coupled to the output axle 14, and the coupled output side gears 30, 32, and 34 and output axle 14 rotate integrally. When the clutches 40, 42, and 44 are disengaged, that is in an OFF-state, the output side gears 30, 32, and 34 are restrained from moving in the axial direction of the output axle 14, to be made relatively rotatable with respect to the output axle 14.

When the clutches 40, 42, and 44 are in an ON-state, if there is no slipping etc., in the clutches 40, 42, and 44, it is possible to transmit a rotation angle accurately and transmit power efficiently to the output axle 14 from the output side gears 30, 32, and 34 for which the clutches 40, 42, and 44 are in an ON-state.

Meshing clutches such as dog clutches, jaw clutches, or tooth-shaped clutches are preferably used as the clutches 40, 42, and 44. The reason for this is that, in contrast to the possibility that friction clutches such as disk clutches and drum clutches cause slipping therein, the mechanical structures such as protrusions and holes formed at their driving sides and driven sides mesh together in meshing clutches, which does not cause slipping as in friction clutches, and therefore, it is possible to transmit a rotation angle extremely accurately and transmit power highly efficiently with use of meshing clutches. Note that the clutches 40, 42, and 44 are not limited to meshing clutches such as dog clutches, and friction clutches or the like other than meshing clutches may be used.

Although not illustrated, the clutches 40, 42, and 44 are driven by an actuator, and the operation of the actuator is controlled by a control device. Further, a phase of the non-circular gear pair 18 is detected by a sensor (not shown), and a detection signal from the sensor is input to the control device. The control device controls ON and OFF of the clutches 40, 42, and 44 so as to be able to switch a reduction ratio without stopping rotation, to transmit a rotation angle accurately, and to transmit power efficiently.

The respective gear pairs 16, 17, and 18 are selectively coupled between the input axle 12 and the output axle 14 due to the clutches 40, 42, and 44 becoming an ON-state. When the first gear pair 16 is coupled between the input axle 12 and the output axle 14 due to the clutch 40 becoming an ON-state, a reduction ratio between the input axle 12 and the output axle 14 becomes a relatively high constant reduction ratio $R_H$. When the second gear pair 17 is coupled between the input axle 12 and the output axle 14 due to the clutch 42 becoming an ON-state, a reduction ratio between the input axle 12 and the output axle 14 becomes a relatively low constant reduction ratio $R_L$. When the non-circular gear pair 18 is coupled between the input axle 12 and the output axle 14 due to the clutch 44 becoming an ON-state, a reduction ratio between the input axle 12 and the output axle 14 changes within a range including at least the reduction ratios $R_H$ and $R_L$.

Figure 2:
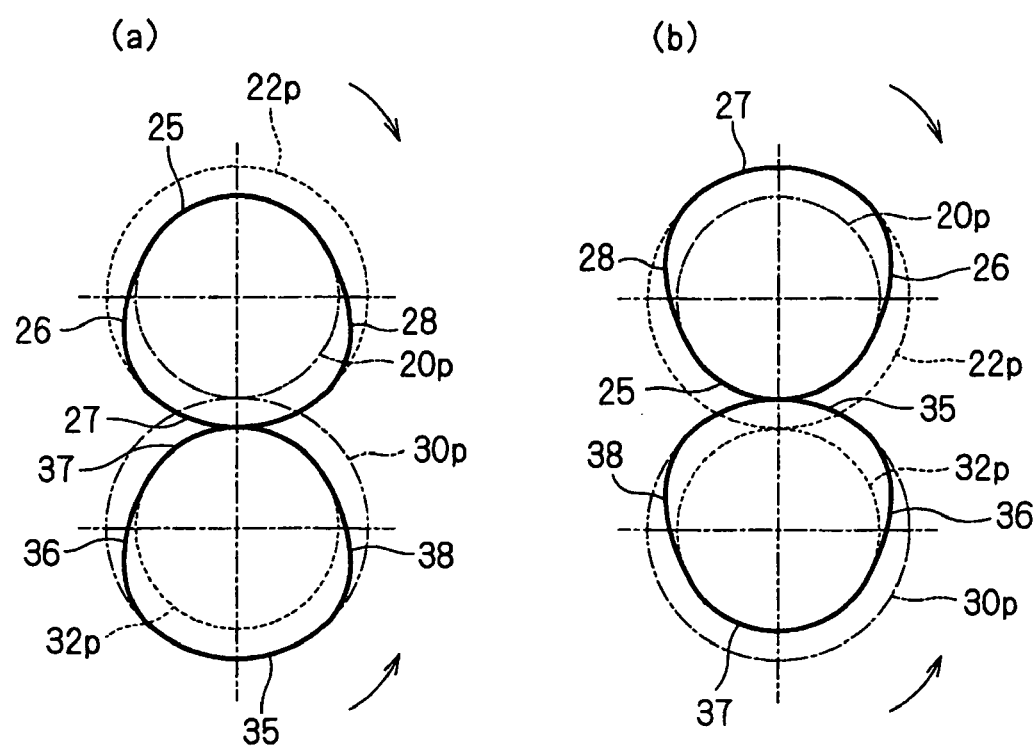
FIG. 2 are diagrams schematically showing pitch circles or pitch curves of gears of the transmission. (Embodiment 1)

For example, as shown in FIG. 2, given that the gears of the respective gear pairs 16, 17, and 18 are expressed in meshing pitch circles (hereinafter, simply called "pitch circles") or meshing pitch curves (hereinafter, simply called "pitch curves"), and illustrations of the faces of teeth are omitted, the first and second gear pairs 16 and 17 are circular gears in which pitch circles 20$p$ and 30$p$, and 22$p$ and 32$p$ of the paired gears 20 and 30, and 22 and 32 contact each other.

The paired gears 24 and 34 of the non-circular gear pair 18 are non-circular gears. The pitch curves of the paired gears 24 and 34 of the non-circular gear pair 18 have a first section 25 and 35 which is equal to the circular arcs of the pitch circles 20$p$ and 30$p$ of the first gear pair 16 with the reduction ratio $R_H$, a third section 27 and 37 which is equal to the circular arcs of the pitch circles 22$p$ and 32$p$ of the second gear pair with the reduction ratio $R_L$, and second and fourth sections 26 and 36, and 28 and 38 where their reduction ratios change between $R_H$ and $R_L$. When the paired gears 24 and 34 of the non-circular gear pair 18 rotate in a direction shown by the arrows in FIG. 2, the respective sections 25 and 35, 26 and 36, 27 and 37, and 28 and 38 of the pitch curves of the gears 24 and 34 mesh together.

In a situation in which the non-circular gear pair 18 is coupled between the input axle 12 and the output axle 14, in a case in which the non-circular gear pair 18 meshes together in the third section 27 and 37 as shown in FIG. 2A, a reduction ratio between the input axle 12 and the output axle 14 becomes $R_L$, and in a case in which the non-circular gear pair 18 meshes together in the first section 25 and 35 as shown in FIG. 2B, a reduction ratio between the input axle 12 and the output axle 14 becomes $R_H$. In a case in which the non-circular gear pair 18 meshes together in the second section 26 and 36 and the fourth section 28 and 38, a reduction ratio between the input axle 12 and the output axle 14 changes between $R_L$ and $R_H$.

Figure 3:
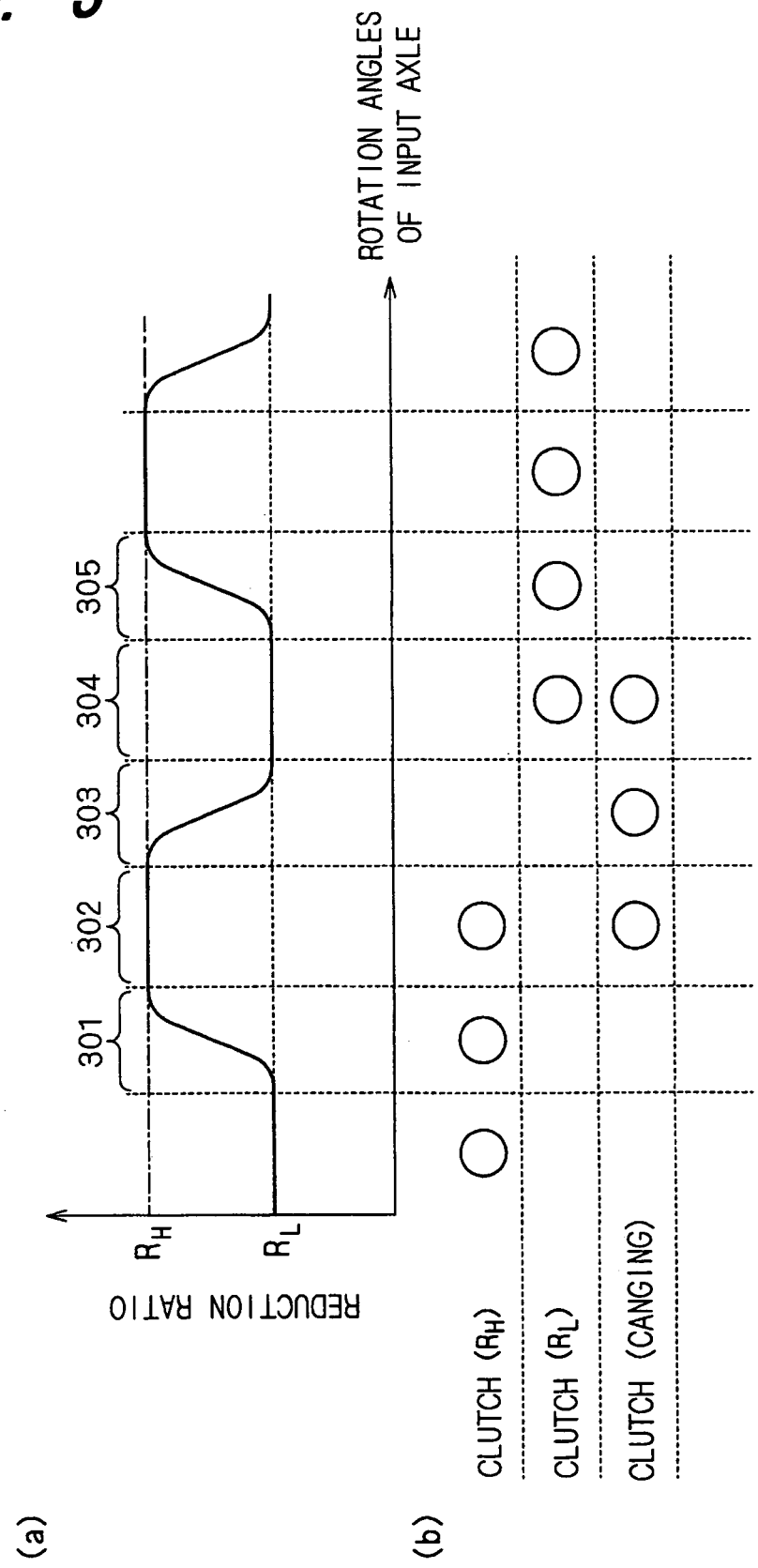
FIG. 3A is a graph schematically showing changes in a reduction ratio of a non-circular gear pair.
FIG. 3B is a table showing ON and OFF of clutches. (Embodiment 1)
Figure 4:
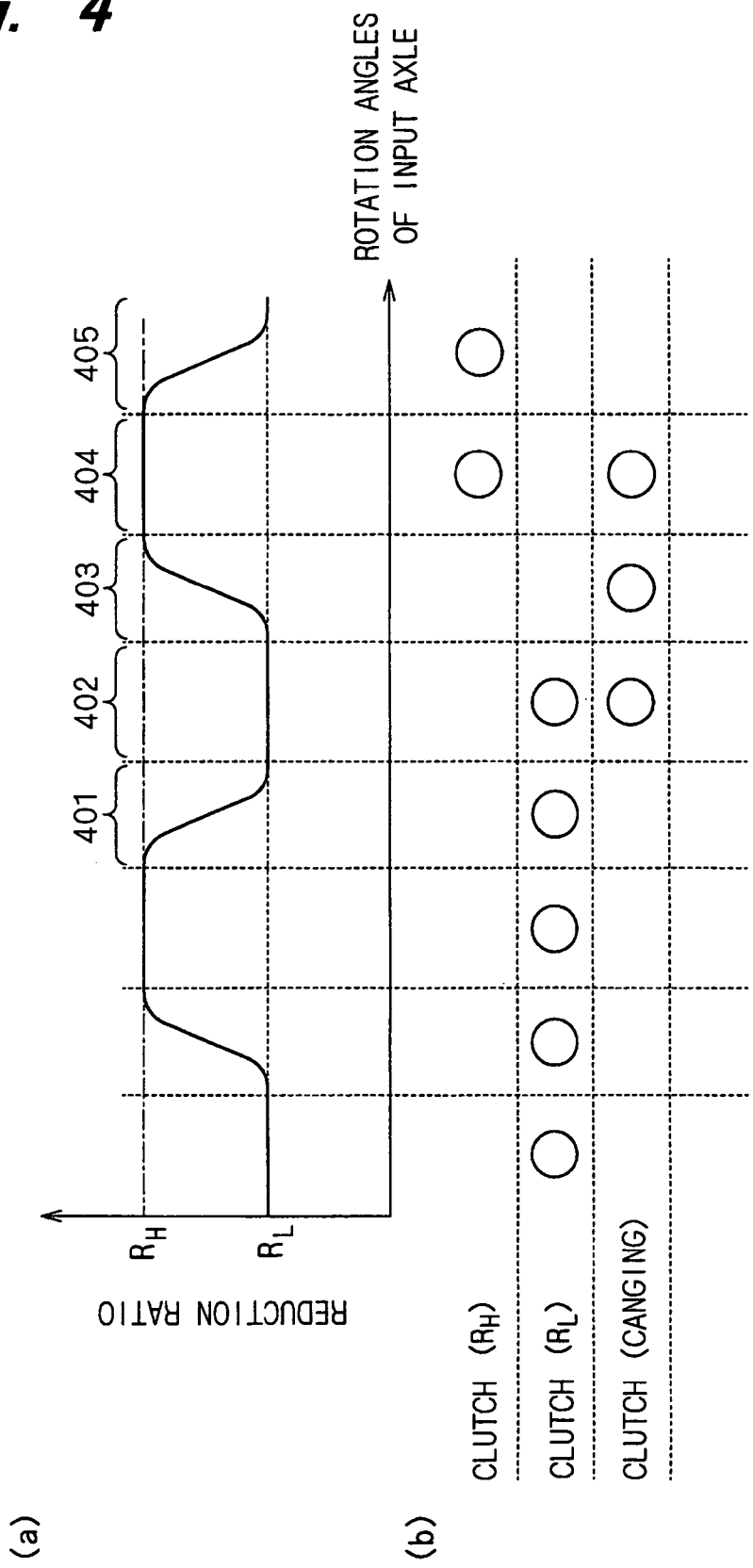
FIG. 4A is a graph schematically showing changes in a reduction ratio of the non-circular gear pair.
FIG. 4B is a table showing ON and OFF of the clutches. (Embodiment 1)

Next, the operation of the transmission 10 will be described with reference to FIGS. 3 and 4. FIGS. 3A and 4A are graphs of reduction ratios of the non-circular gear pair 18. Rotation angles of the input axle 12 are plotted along the abscissas, and reduction ratios between the input side gear 24 and the output side gear 34 are plotted along the coordinates. In the tables of FIGS. 3B and 4B, the ON-states of the clutches 40, 42, and 44 are denoted by "○" marks, and the OFF-states of the clutches 40, 42, and 44 are left blank. In FIGS. 3B and 4B, the clutch 40 of the first gear pair 16 with the reduction ratio $R_H$ is described as "clutch ($R_H$)," the clutch 42 of the second gear pair 17 with the reduction ratio $R_L$ is described as "clutch ($R_L$)," and the clutch 44 of the non-circular gear pair 18 whose reduction ratio changes is described as "clutch (variable speed)."

When the clutch 40 of the first gear pair 16 with the reduction ratio $R_H$ is in an ON-state, and the clutches 42 and 44 are in an OFF-state, a reduction ratio between the input axle 12 and the output axle 14 becomes the constant reduction ratio $R_H$. When the clutch 42 of the second gear pair 17 with the reduction ratio $R_L$ is in an ON-state, and the clutches 40 and 44 are in an OFF-state, a reduction ratio between the input axle 12 and the output axle 14 becomes the constant reduction ratio $R_L$. The reduction ratio of the non-circular gear pair 18 changes within a predetermined range including the reduction ratios $R_H$ and $R_L$ according to a rotation of the input axle 12 as shown in FIGS. 3A and 4A. Note that, in FIGS. 3A and 4A, the curves when the reduction ratio of the non-circular gear pair 18 changes are schematically illustrated.

In a case in which the reduction ratio between the input axle 12 and the output axle 14 is changed from $R_H$ to $R_L$, the clutches 40, 42, and 44 are operated as follows.

As shown in FIG. 3A, in a state in which the clutch 40 of the first gear pair 16 with the reduction ratio $R_H$ is in an ON-state, when the meshing thereof passes through a section 301 in which the reduction ratio of the non-circular gear pair 18 changes from $R_L$ to $R_H$ to enter into a section 302 in which the reduction ratio becomes the constant reduction ratio $R_H$, as shown in FIG. 3B, the clutch 44 of the non-circular gear pair 18 whose reduction ratio changes is made into an ON-state in addition to the clutch 40 of the first gear pair 16 with the reduction ratio $R_H$. Then, after the clutch 44 of the non-circular gear pair 18 becomes an ON-state in the section 302, and before the meshing thereof enters into a section 303 in which the reduction ratio of the non-circular gear pair 18 changes from $R_H$ to $R_L$, the clutch 40 of the first gear pair 16 with the reduction ratio $R_H$ is made into an OFF-state.

Then, in the section 303 in which the reduction ratio of the non-circular gear pair 18 changes from $R_H$ to $R_L$, only the clutch 44 of the non-circular gear pair 18 is in an ON-state. In the section 303, because the non-circular gear pair 18 is coupled between the input axle 12 and the output axle 14, the reduction ratio between the input axle 12 and the output axle 14 changes from $R_H$ to $R_L$. If there is no slipping in the clutch 44 during this time, the meshing of the non-circular gear pair 18 enables to transmit a rotation angle accurately and transmit power efficiently from the input axle 12 to the output axle 14.

When the meshing thereof passes through the section 303 in which the reduction ratio of the non-circular gear pair 18 changes from $R_H$ to $R_L$ to enter into a section 304 in which the reduction ratio becomes the constant reduction ratio $R_L$, as shown in FIG. 3B, the clutch 42 of the second gear pair 17 with the reduction ratio $R_L$ is made into an ON-state. Then, after the clutch 42 of the second gear pair 17 becomes an ON-state in the section 304, and before the meshing thereof enters into a section 305 in which the reduction ratio of the non-circular gear pair 18 changes from $R_L$ to $R_H$, the clutch 44 of the non-circular gear pair 18 is made into an OFF-state. In this way, after only the second gear pair 17 is coupled between the input axle 12 and the output axle 14, the reduction ratio between the input axle 12 and the output axle 14 becomes the constant reduction ratio $R_L$, and the meshing of the second gear pair 17 enables to transmit a rotation angle accurately and transmit power efficiently from the input axle 12 to the output axle 14.

Because the clutches 40, 42, and 44 are switched ON or OFF when their driving sides and the driven sides are at a same speed, meshing clutches such as dog clutches can be used as the clutches 40, 42, and 44 without problems.

In a case in which the reduction ratio between the input axle 12 and the output axle 14 is changed from $R_L$ to $R_H$ as well, the clutches 40, 42, and 44 are operated in the same way described above.

That is, as shown in FIG. 4A, when the meshing thereof passes through a section 401 in which the reduction ratio of the non-circular gear pair 18 changes from $R_H$ to $R_L$ to enter into a section 402 in which the reduction ratio becomes the constant reduction ratio $R_L$, as shown in FIG. 4B, the clutch 44 of the non-circular gear pair 18 is made into an ON-state in addition to the clutch 42 of the second gear pair 17. Then, after the clutch 44 of the non-circular gear pair 18 becomes an ON-state in the section 402, and before the meshing thereof enters into a section 403 in which the reduction ratio of the non-circular gear pair 18 changes from $R_L$ to $R_H$, the clutch 42 of the second gear pair 17 with the reduction ratio $R_L$ is made into an OFF-state.

Then, in the section 403 in which the reduction ratio of the non-circular gear pair 18 changes from $R_L$ to $R_H$, only the clutch 44 of the non-circular gear pair 18 is in an ON-state. In the section 403, because only the non-circular gear pair 18 is coupled between the input axle 12 and the output axle 14, the reduction ratio between the input axle 12 and the output axle 14 changes from $R_L$ to $R_H$. If there is no slipping in the clutch 44 during this time, the meshing of the non-circular gear pair 18 enables to transmit a rotation angle accurately and transmit power efficiently from the input axle 12 to the output axle 14.

When the meshing thereof passes through the section 403 in which the reduction ratio of the non-circular gear pair 18 changes from $R_L$ to $R_H$ to enter into a section 404 in which the reduction ratio becomes the constant reduction ratio $R_H$, as shown in FIG. 4B, the clutch 40 of the first gear pair 16 with the reduction ratio $R_H$ is made into an ON-state. Then, after the clutch 40 of the first gear pair 16 becomes an ON-state in the section 404, and before the meshing thereof enters into a section 405 in which the reduction ratio of the non-circular gear pair 18 changes from $R_H$ to $R_L$, the clutch 44 of the non-circular gear pair 18 is made into an OFF-state. In this way, after only the first gear pair 16 is coupled between the input axle 12 and the output axle 14, the reduction ratio between the input axle 12 and the output axle 14 becomes the constant reduction ratio $R_H$, and the meshing of the first gear pair 16 enables to transmit a rotation angle accurately and transmit power efficiently from the input axle 12 to the output axle 14.

Figure 6:
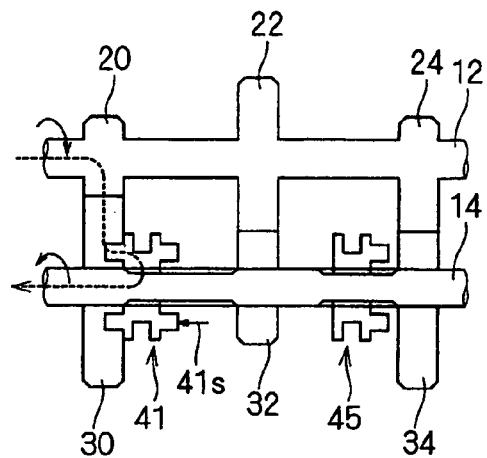
FIG. 6 are cross-sectional views showing the operations of the transmission. (Embodiment 1)
Figure 6:
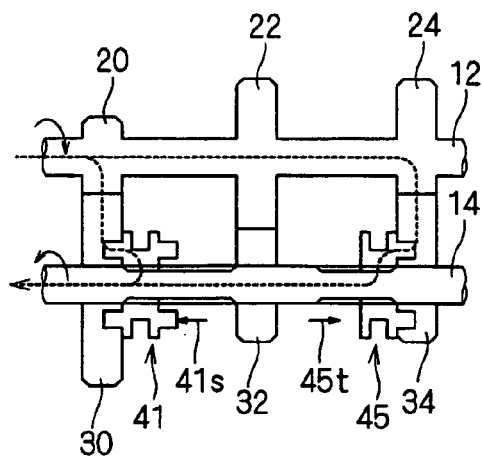
Figure 6:
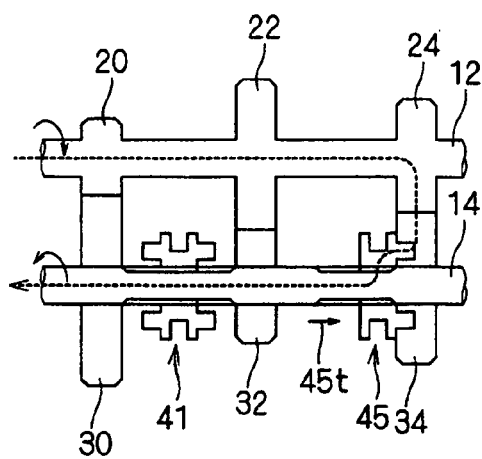
Figure 7:
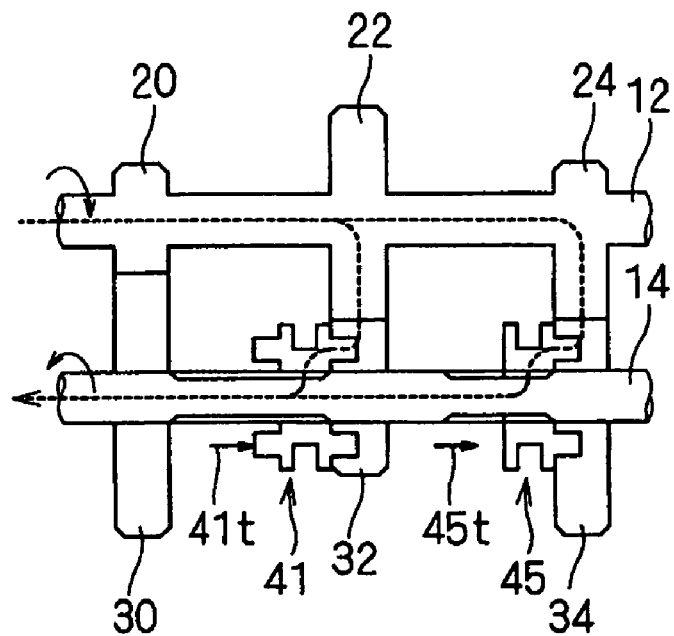
FIG. 7 are cross-sectional views showing the operations of the transmission. (Embodiment 1)
Figure 7:
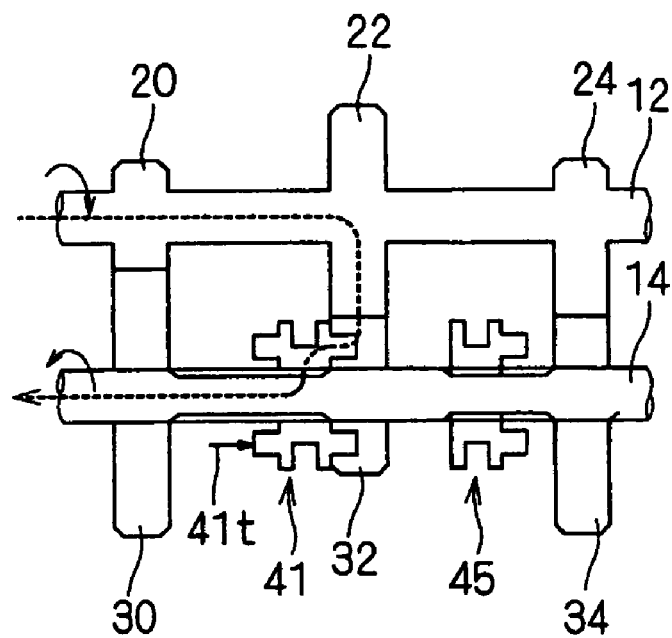

Next, a concrete configuration example of the transmission 10 will be described with reference to FIGS. 5 to 7.

Figure 5:
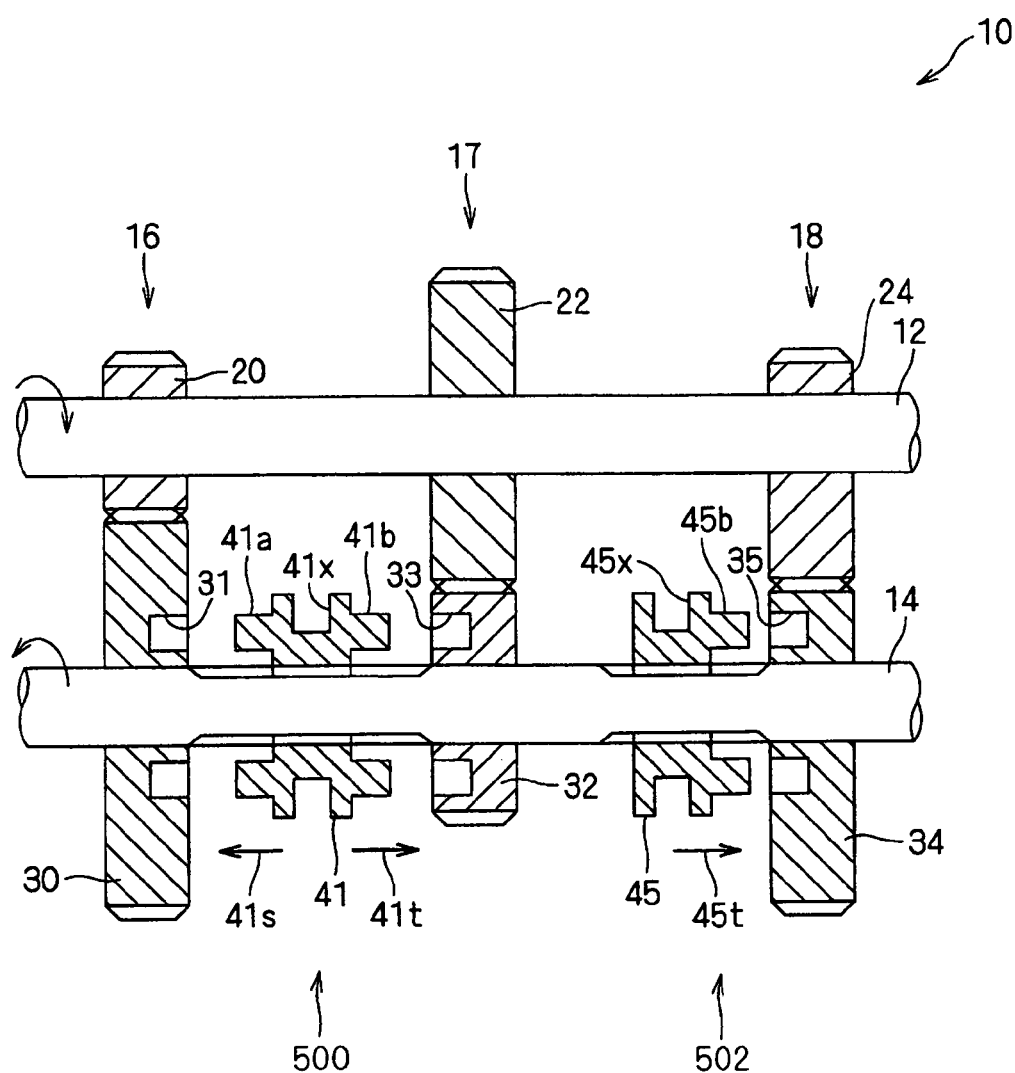
FIG. 5 is a cross-sectional view showing the configuration of the transmission. (Embodiment 1)

As shown in a cross-sectional view of FIG. 5, the input side gears 20, 22, and 24 of the respective gear pairs 16, 17, and 18 are fixed to the input axle 12 in series. The output side gears 30, 32, and 34 of the respective gear pairs 16, 17, and 18 are supported in series so as to be relatively rotatable, but being immovable axially by the output axle 14. A shifter 41 of a circular gear-use clutch 500 is arranged between the output side gear 30 of the first gear pair 16 and the output side gear 32 of the second gear pair 17. The circular gear-use clutch 500 serves as the shifter 41 as well, to achieve the both functions as a first clutch for the first gear pair 16 and a second clutch for the second gear pair 17. A shifter 45 of a non-circular gear-use clutch 502 is arranged between the output side gear 32 of the second gear pair 17 and the output side gear 34 of the non-circular gear pair 18. The shifters 41 and 45 of the circular gear-use clutch 500 and the non-circular gear-use clutch 502 are supported slidably along splines formed in the output axle 14. The shifters 41 and 45 are freely-movable axially along the output axle 14, but are not relatively rotatable with respect to the output axle 14, and the shifters 41 and 45 rotate integrally with the output axle 14.

Slots 41x and 45x into which an actuator (not shown) is fitted are formed in the outer circumferential surfaces of the shifters 41 and 45 of the circular gear-use clutch 500 and the non-circular gear-use clutch 502. The shifter 41 of the circular gear-use clutch 500 moves to the both sides as shown by arrows 41s and 41t from the intermediate position shown in FIG. 5 by driving of the actuator (not shown) fitted into the slot 41x. The shifter 45 of the non-circular gear-use clutch 502 moves to only the one side shown by an arrow 45t from the waiting position shown in FIG. 5 by driving of the actuator (not shown) fitted into the slot 45x.

In the shifter 41 of the circular gear-use clutch 500, protrusions (dogs) 41a and 41b are formed at predetermined pitches on a side face facing the output side gear 30 of the first gear pair 16 and a side face facing the output side gear 32 of the second gear pair 17. In the output side gear 30 of the first gear pair 16 and the output side gear 32 of the second gear pair 17, as components of the circular gear-use clutch 500, recessed portions (dog holes) 31 and 33 are formed at predetermined pitches so as to correspond to the protrusions 41a and 41b of the shifter 41 of the circular gear-use clutch 500, in side faces facing the shifter 41 of the circular gear-use clutch 500. When the shifter 41 of the circular gear-use clutch 500 moves in the directions shown by the arrows 41s and 41t, the protrusions 41a and 41b of the shifter 41 of the circular gear-use clutch 500 are fitted into the recessed portions 31 and 33 of the output side gears 30 and 32, and the output axle 14 and the output side gears 30 and 32 rotate integrally via the shifter 41 of the circular gear-use clutch 500. That is, the first or second gear pair 16 or 17 is coupled between the input axle 12 and the output axle 14, which makes it possible to transmit a rotation angle accurately, and transmit power efficiently to the output axle 14 via the first or second gear pair 16 or 17 from the input axle 12.

In the shifter 45 of the non-circular gear-use clutch 502, protrusions (dogs) 45b are formed at predetermined pitches on a side face facing the output side gear 34 of the non-circular gear pair 18. In the output side gear 34 of the non-circular gear pair 18, as components of the non-circular gear-use clutch 502, recessed portions (dog holes) 35 are formed at predetermined pitches so as to correspond to the protrusions 45b of the shifter 45 of the non-circular gear-use clutch 502, on the side face facing the shifter 45 of the non-circular gear-use clutch 502. When the shifter 45 of the non-circular gear-use clutch 502 moves to the direction shown by the arrow 45t, the protrusions 45b of the shifter 45 of the non-circular gear-use clutch 502 are fitted into the recessed portions 35 of the output side gears 34 of the non-circular gear pair 18, and the output axle 14 and the output side gear 34 rotate integrally via the shifter 45 of the non-circular gear-use clutch 502. That is, the non-circular gear pair 18 is coupled between the input axle 12 and the output axle 14, which makes it possible to transmit a rotation angle accurately, and transmit power efficiently to the output axle 14 via the non-circular gear pair 18 from the input axle 12.

Next, the operation of the transmission 10 will be described with reference to FIGS. 6 to 7.

As shown in FIG. 6A, when the shifter 41 of the circular gear-use clutch 500 moves to the direction shown by the arrow 41s, to be fitted into the output side gear 30 of the first gear pair 16, and the shifter 45 of the non-circular gear-use clutch 502 is at the waiting position, only the first gear pair 16 is coupled between the input axle 12 and the output axle 14. At this time, as shown by the dashed line in the drawing, the rotation angle and power are transmitted from the input axle 12 to the output axle 14 via the input side gear 20 and the output side gear 30 of the first gear pair 16; and the shifter 41 of the circular gear-use clutch 500, and the reduction ratio becomes $R_H$.

When the reduction ratio is switched from $R_H$ to $R_L$, first, as shown in FIG. 6B, in a state in which the reduction ratio of the non-circular gear pair 18 becomes $R_H$, the shifter 45 of the non-circular gear-use clutch 502 moves to the direction shown by the arrow 45t, to be fitted into the output side gear 34 of the non-circular gear pair 18, and the first gear pair 16 and the non-circular gear pair 18 are coupled between the input axle 12 and the output axle 14. At this time, as shown by the dashed line in the drawing, the rotation angle and power are transmitted from the input axle 12 to the output axle 14 via (a) the input side gear 20 and the output side gear 30 of the first gear pair 16, and the shifter 41 of the circular gear-use clutch 500, and via (b) the input side gear 24 and the output side gear 34 of the non-circular gear pair 18, and the shifter 45 of the non-circular gear-use clutch 502.

Next, before the reduction ratio of the non-circular gear pair 18 changes from $R_H$, as shown in FIG. 6C, the shifter 41 of the circular gear-use clutch 500 moves to the intermediate position, and the fit with the output side gear 30 of the first gear pair 16 is released, and only the non-circular gear pair 18 is coupled between the input axle 12 and the output axle 14. At this time, as shown by the dashed line in the drawing, the rotation angle and power are transmitted from the input axle 12 to the output axle 14 via the input side gear 24 and the output side gear 34 of the non-circular gear pair 18, and the shifter 45 of the non-circular gear-use clutch 502. Then, in a state in which only the non-circular gear pair 18 is coupled, the reduction ratio of the non-circular gear pair 18 changes from $R_H$ to $R_L$.

Next, when the reduction ratio of the non-circular gear pair 18 becomes $R_L$, as shown in FIG. 7D, the shifter 41 of the circular gear-use clutch 500 moves to the direction shown by the arrow 41t, to be fitted into the output side gear 32 of the second gear pair 17, and the second gear pair 17 and the non-circular gear pair 18 are coupled between the input axle 12 and the output axle 14. At this time, as shown by the dashed line in the drawing, the rotation angle and power are transmitted from the input axle 12 to the output axle 14 via (a) the input side gear 22 and the output side gear 32 of the second gear pair 17, and the shifter 41 of the circular gear-use clutch 500, and via (b) the input side gear 24 and the output side gear 34 of the non-circular gear pair 18, and the shifter 45 of the non-circular gear-use clutch 502.

Next, before the reduction ratio of the non-circular gear pair 18 changes from $R_L$, as shown in FIG. 7E, the shifter 45 of the non-circular gear-use clutch 502 moves to the waiting position, and the fit with the output side gear 34 of the non-circular gear pair 18 is released, and only the second gear pair 17 is coupled between the input axle 12 and the output axle 14. At this time, as shown by the dashed line in the drawing, the rotation angle and power are transmitted from the input axle 12 to the output axle 14 via the input side gear 22 and the output side gear 32 of the second gear pair 17, and the shifter 41 of the circular gear-use clutch 500, and the reduction ratio becomes the constant reduction ratio $R_L$, which completes the switching of the reduction ratio.

Next, a concrete design example will be described.

Here, for simplicity, it is assumed that the reduction ratio of the non-circular gear pair 18 changes between the maximum value $R_H$ and the minimum value $R_L$, and an average of the reduction ratios of the non-circular gear pair 18 is 1 (when the input side gear 24 rotates once, the output side gear 34 as well rotates once). Further, it is assumed that, when the input axle 12 rotates by $\pi$ (radian), the non-circular gear pair 18 in a state of meshing together at the center position in a meshing section in which the reduction ratio becomes $R_H$ (or $R_L$) becomes a state of meshing together at the center position in a meshing section in which the reduction ratio becomes $R_L$ (or $R_H$).

In the respective states of (1) the process in which the reduction ratio changes from $R_L$ to $R_H$, (2) the process in which the reduction ratio changes from $R_H$ to (3) that the reduction ratio is $R_L$ which is constant, and (4) that a reduction ratio is $R_H$ which is constant, when the input axle 12 rotates by $\pi$ (radian), rotation angles of the input axle 12, the output axle 14, the output side gears 30 and 32 of the first and second gear pairs 16 and 17, and the output side gear 34 of the non-circular gear pair 18 are as shown in the following Table 1.

TABLE 1

| | Input axle | output axle | Input side gears of first gear pair | output side gears of second gear pair | output side gears of non-circular gear pair |
|---|---|---|---|---|---|
| (1) $R_L \to R_H$ changing process | $\pi$ | $\pi$ | $\dfrac{\pi}{R_H}$ | $\dfrac{\pi}{R_L}$ | $\pi$ |
| (2) $R_H \to R_L$ changing process | $\pi$ | $\pi$ | $\dfrac{\pi}{R_H}$ | $\dfrac{\pi}{R_L}$ | $\pi$ |
| (3) $R_L$ constant | $\pi$ | $\dfrac{\pi}{R_L}$ | $\dfrac{\pi}{R_H}$ | $\dfrac{\pi}{R_L}$ | $\pi$ |
| (4) $R_H$ constant | $\pi$ | $\dfrac{\pi}{R_H}$ | $\dfrac{\pi}{R_H}$ | $\dfrac{\pi}{R_L}$ | $\pi$ |

Phase differences between the output axle 14 and the respective output side gears 30, 32, and 34 are, by using the output axle 14 as a standard, values in which the rotation angle of the output axle 14 is subtracted from the rotation angles of the respective output side gears 30, 32, and 34 in Table 1, and those values are as shown in the following Table 2.

TaBLE 2

| | Input side gears of first gear pair | output side gears of second gear pair | output side gears of non-circular gear pair |
|---|---|---|---|
| (1) $R_L \to R_H$ changing process | $\pi\left(\dfrac{1}{R_H} - 1\right)$ | $\pi\left(\dfrac{1}{R_L} - 1\right)$ | 0 |
| (2) $R_H \to R_L$ changing process | $\pi\left(\dfrac{1}{R_H} - 1\right)$ | $\pi\left(\dfrac{1}{R_L} - 1\right)$ | 0 |
| (3) $R_L$ constant | $\pi\left(\dfrac{1}{R_H} - \dfrac{1}{R_L}\right)$ | 0 | $\pi\left(1 - \dfrac{1}{R_L}\right)$ |
| (4) $R_H$ constant | 0 | $\pi\left(\dfrac{1}{R_L} - \dfrac{1}{R_H}\right)$ | $\pi\left(1 - \dfrac{1}{R_H}\right)$ |

Here, the following state is assumed. Where $m_{LH}$, $m_{HL}$, $m_L$, and $m_H$ are all integers.
(a) The process in which the reduction ratio is changed from $R_L$ to $R_H$ is carried out $m_{LH}$ times. That is, the total angle by which the input axle 12 rotates in the state of "$R_L \to R_H$ CHANGING PROCESS" is $\pi \cdot m_{LH}$.
(b) The process in which the reduction ratio is changed from $R_H$ to $R_L$ is carried out $m_{HL}$ times. That is, the total angle by which the input axle 12 rotates in the state of "$R_H \to R_L$ CHANGING PROCESS" is $\pi \cdot m_{HL}$.
(c) The total angle by which the input axle 12 rotates in the state of the rotation ratio of $R_L$ constant is $\pi \cdot m_L$.
(d) The total angle by which the input axle 12 rotates in the state of the rotation ratio of $R_H$ constant is $\pi \cdot m_H$. In this case, the constraint condition is one of $m_{LH}=m_{HL}$, $m_{HL}-1$, and $m_{HL}+1$.

If the respective items in Table 2 are multiplied by $m_{LH}$, $m_{HL}$, $m_L$, and $m_H$ and they are added in consideration of the above-described (a) to (d), the following values are found.
(i) The total value $K_H$ of phase differences between the output axle 14 and the output side gear 30 of the first gear pair 16 is;

$K_H = \pi(1/R_H-1)m_{LH} + \pi(1/R_H-1)m_{HL} + \pi(1/R_H-1/R_L)m_L.$ (ii) The total value $K_L$ of phase differences between the output axle 14 and the output side gear 32 of the second gear pair 17 is;

$K_L = \pi(1/R_L-1)m_{LH} + \pi(1/R_L-1)m_{HL} + \pi(1/R_L-1/R_H)m_H.$ (iii) The total value $K_{LH}$ of phase differences between the output axle 14 and the output side gear 34 of the non-circular gear pair 18 is;

$K_{LH} = \pi(1-1/R_L)m_L + \pi(1-1/R_H)m_H.$

Here, the number of the protrusions 41b (dog holes 33) of the clutch 500 to allow the second gear pair into an ON or OFF-state is n. It is assumed that the protrusions (dog holes) are positioned at even intervals on one circle. For example, if the $K_L/(2\pi)$ becomes (integer)/n with respect to any one of $m_{LH}$, $m_{HL}$, $m_L$, and $m_H$, the protrusions 41b and the dog holes 33 of the clutch 500 can be fitted into one another, and therefore, a dog clutch can be used for the output side gear 32 of the second gear pair 17. In this case, it suffices to satisfy the following formula.

$$\text{(integer)}/n = K_L/(2\pi) \quad (1)$$
$$= (1/2)\{(1/R_L - 1m)_{LH} + (1/R_L - 1)m_{HL} +$$
$$(1/R_L - 1/R_H)m_H\}$$

Here, a concrete example will be taken up. That is, as an initial state, it is assumed that the non-circular gear pair 18 meshes together at the center position in a meshing section in which the reduction ratio of the non-circular gear pair 18 becomes $R_H$. Further, at this time, it is assumed that any clutch is capable of making the protrusions and the dog holes fit into one another therein. Moreover, a case in which only the first gear pair 16 is coupled between the input axle 12 and the output axle 14, and a rotation starts from a state of the reduction ratio of $R_H$ which is constant will be taken up.

Here, the following state is assumed. Where $m_{LH}$, $m_{HL}$, $m_L$, and $m_H$ are all integers, and moreover, $m_L$ and $m_H$ are even numbers, i.e., $m_L=2m_L'$; $m_H=2m_H'$ ($m_L'$ and $m_H'$ are integers).
(a) The process in which the reduction ratio is changed from $R_L$ to $R_H$ is carried out $m_{LH}$ times. That is, the total angle by which the input axle 12 rotates in the state of "$R_L \to R_H$ CHANGING PROCESS" is $\pi \cdot m_{LH}$.
(b) The process in which the reduction ratio is changed from $R_H$ to $R_L$ is carried out $m_{HL}$ times. That is, the total angle by which the input axle 12 rotates in the state of "$R_H \to R_L$ CHANGING PROCESS" is $\pi \cdot m_{HL}$.
(c) The total angle by which the input axle 12 rotates in the state of the rotation ratio of $R_L$ constant is $\pi \cdot 2m_L'$.
(d) The total angle by which the input axle 12 rotates in the state of the rotation ratio of $R_H$ constant is $\pi \cdot 2m_H'$.
In this case, the constraint condition is one of $m_{LH}=m_{HL}$ and $m_{HL}-1$.
If the respective items in Table 2 are multiplied by $m_{LH}$, $m_{HL}$, $2m_L'$, and $2m_H'$ and they are added in consideration of the above-described (a) to (d), the following values are found.

(i) The total value $K_H$ of phase differences between the output axle 14 and the output side gear 30 of the first gear pair 16 is;

$$K_H = \pi(1/R_H - 1)m_{LH} + \pi(1/R_H - 1)m_{HL} + 2\pi(1/R_H - 1/R_L)m_L'.$$

(ii) The total value $K_L$ of phase differences between the output axle 14 and the output side gear 32 of the second gear pair 17 is;

$$K_L = \pi(1/R_L - 1)m_{LH} + \pi(1/R_L - 1)m_{HL} + 2\pi(1/R_L - 1/R_H)m_H'.$$

(iii) The total value $K_{LH}$ of phase differences between the output axle 14 and the output side gear 34 of the non-circular gear pair 18 is;

$$K_{LH} = 2\pi(1 - 1/R_L)m_L' + 2\pi(1 - 1/R_H)m_H'.$$

Here, the number of the protrusions 41b (dog holes 33) of the clutch 500 to allow the second gear pair into an ON or OFF-state is n. It is assumed that the protrusions (dog holes) are positioned at even intervals on one circle. For example, if $K_L/(2\pi)$ becomes (integer)/n with respect any one of $m_{LH}$, $m_{HL}$, $m_L'$, and $m_H'$, the protrusions 41b and the dog holes 33 of the clutch 500 can be fitted into one another, and therefore, a dog clutch can be used for the output side gear 32 of the second gear pair 17. In this case, it suffices to satisfy the following formula.

$$\begin{aligned}(\text{integer})/n &= K_L/(2\pi) \\ &= (1/2)\{(1/R_L - 1)m_{LH} + 2(1/R_L - 1)m_{HL} + \\ &\quad (1/R_L - 1/R_H)m_H'\}\end{aligned} \quad (1')$$

As an example of a possible solution for the above-described formula (1) or formula (1'),
a case of
(a) n=2n' (where n' is an integer, i.e., n is an even number), and
(b) $1/R_L$ and $1/R_H$ both can be expressed by (integer)/n', is considered.
For example, if $$n'=10, n=20, 1/R_H=8/10, 1/R_L=12/10 \quad (1)$$

$$n'=10, n=20, 1/R_H=8/10, 1/R_L=14/10, \quad (2)$$

the formulas are satisfied.

The solution of (1) is an example of $(1/R_L + 1/R_H)/2 = 1$. The solution of (2) is an example of $(1/R_L + 1/R_H)/2 \neq 1$. With respect to (2), for example, a section in which the reduction ratio $R_L$ of the non-circular gear pair 18 is shortened, and a section of the reduction ratio $R_H$ is lengthened such that an average of the reduction ratios of the non-circular gear pair 18 becomes 1.

Accordingly, the transmission 10 can be composed of dog clutches.

In the same way as in a case in which an average of the reduction ratios of the non-circular gear pair 18 is 2 (when the input side gear 24 rotates twice, the output side gear 34 rotates once), 3 (when the input side gear 24 rotates three times, the output side gear 34 rotates once), 4, 5, ..., or the like, the transmission 10 can be composed of dog clutches. For example, an average of the reduction ratios of the non-circular gear pair 18 can be made into 2 by use of the input side gear 24 having one set of the section of the reduction ratio $R_H$ and the section of the reduction ratio $R_L$, and the output side gear 34 having two sets of the section of the reduction ratio $R_H$ and the section of the reduction ratio $R_L$. Further, an average of the reduction ratios of the non-circular gear pair 18 can be made into 3 by use of the input side gear 24 having one set of the section of the reduction ratio $R_H$ and the section of the reduction ratio $R_L$, and the output side gear 34 having three sets of the section of the reduction ratio $R_H$ and the section of the reduction ratio $R_L$.

<Manufacturing Example> A manufacturing example of Embodiment 1 will be described.

The specifications of the gears used for first and second gear pairs are shown in the following Table 3. In the first gear pair, the gear (1) is at the input side, and the gear (2) is at the output side, and in the second gear pair, the gear (1) is at the output side, and the gear (2) is at the input side. The reduction ratios of the first and second gear pairs are 1.25 and 0.8.

TABLE 3

|  | gear(1) | gear(2) |
|---|---|---|
| module | 2 | 2 |
| pressure angle | 20° | 20° |
| helix angle | 0° | 0° |
| number of teeth | 32 | 40 |
| reference circle diameter | 64 mm | 80 mm |
| addendum circle diameter | 68 mm | 84 mm |
| width of tooth | 20 mm | 20 mm |
| center distance | 72 mm | |

In the non-circular gear pair, two non-circular gears having a same shape are meshed together. The non-circular gears are manufactured by use of a module 2 and a tool with a pressure angle of 20° so as to have 36 teeth in all and such that a reference circle diameter in a meshing section at 0°±approximately 38° becomes 32 mm, and a reference circle diameter in a meshing section at 180°±approximately 30° becomes 40 mm, and those are meshed together with a distance of center of 72 mm. In the manufactured non-circular gear pair, the reduction ratio in the section in which a rotation angle of one of the non-circular gears is 0°±approximately 38° is 1.25, and the reduction ratio in the section in which a rotation angle thereof is 180°±approximately 30° is 0.8.

The meshing clutches respectively having 200 teeth (protrusions) have been provided at the output sides of the first and second gear pairs and the non-circular gear pair.

The transmission in the manufacturing example was capable of smoothly switching a reduction ratio while transmitting rotation and power by making the meshing clutches become an ON or OFF-state.

<Variation 1> In Embodiment 1 (refer to FIG. 1), because the non-circular gear pair 18 rotates increasing and decreasing its reduction ratio in an unloaded condition when the clutch 44 is in an OFF-state, the non-circular gears 24 and 34 relatively move within their backlash range, which may cause a problem of vibration thereby. In such a case, slidingly-contact members whose cross sections perpendicular to the axes of the outer circumferential surfaces substantially match to the pitch curves of the respective non-circular gears 24 and 34, may be provided in parallel with the non-circular gears 24 and 34 (for example, the slidingly-contact members are fixed to the non-circular gears 24 and 34), and the slidingly-contact members may rotate integrally with the non-circular gears 24 and 34 while their outer circumferential surfaces always frictionally contact each other. Thereby, a free movement of the backlash between the non-circular gears 24 and 34 is limited by the frictional contact of the outer circumferential surfaces of the slidingly-contact members to some extent, which makes it possible to reduce vibration and noise.

<Variation 2> In Embodiment 1 (refer to FIG. 1), the non-circular gear pair 18 may cause a vibration due to unbalanced mass or the like. It is impossible to avoid such a vibration in a state in which the clutch 44 is in an ON-state in a process in which the reduction ratio is changed. However, when the non-circular gear pair 18 rotates at a constant reduction ratio, i.e., in a state in which the clutch 44 is in an OFF-state, the non-circular gear pair 18 is made not to rotate, to avoid such a vibration.

Figure 10:
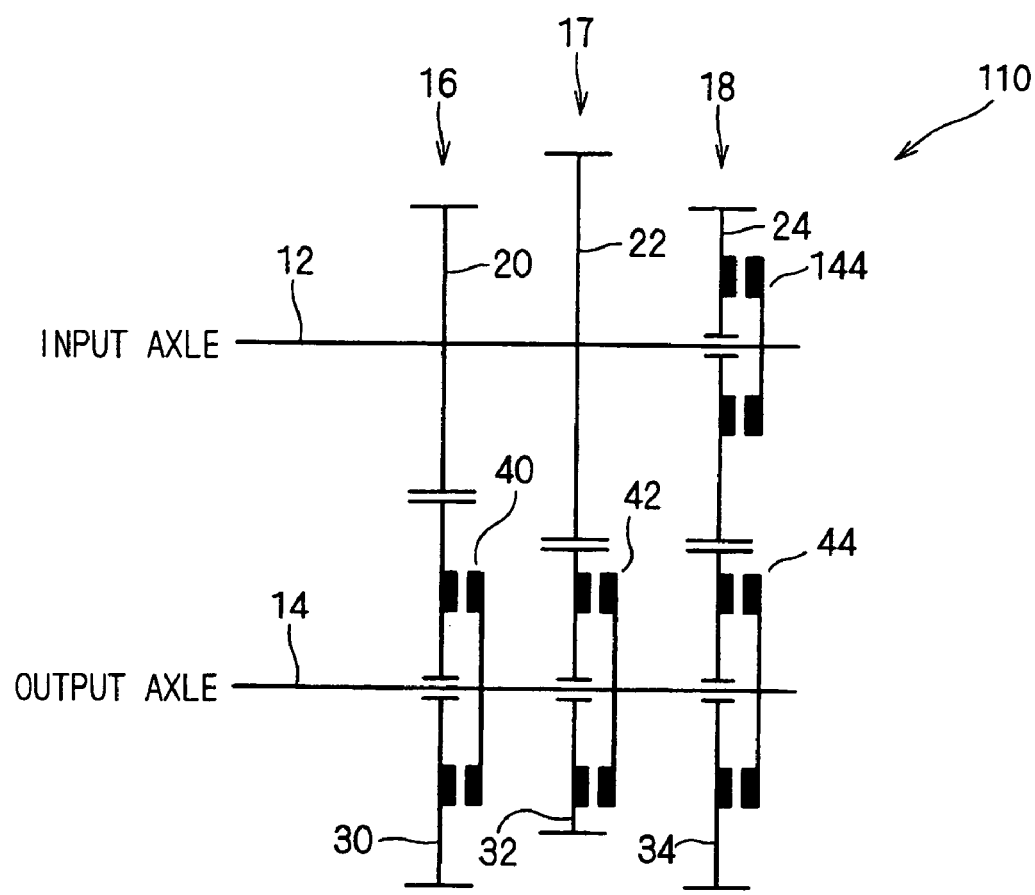
FIG. 10 is a structural chart schematically showing a configuration of a transmission. (Variation 2)

For example, as a transmission 110 shown in FIG. 10, a clutch 144 is provided between one of the gears (input side gear) 24 of the non-circular gear pair 18 and the input axle 12 as well in addition to the configuration of Embodiment 1 in FIG. 1. Then, when the non-circular gear pair 18 rotates at a constant reduction ratio, the clutches 44 and 144 are made into an OFF-state, to interrupt transmission of the rotations from both of the input axle 12 and the output axle 14 to the non-circular gear pair 18, and to operate a brake (not shown) to stop the rotation of the non-circular gear pair 18. Thereby, it is possible not to cause a vibration due to a rotation of the non-circular gear pair 18.

On the other hand, when the reduction ratio is changed, after the clutch 44 is made into an ON-state, the clutches 40, 42, and 44 are operated in the same way as in Embodiment 1. The non-circular gear pair 18 stopping may be made to rotate due to the clutch 144 becoming an ON-state. However, the non-circular gear pair 18 may be driven to rotate by a motor (not shown) etc., in a state in which the clutch 144 is in an OFF-state, and after a rotation speed of the one of the gears (input side gear) 24 of the non-circular gear pair 18 is substantially matched to a rotation speed of the input axle 12, the clutch 144 may be made into an ON-state. In the former case, because there is a difference in rotation speeds at the driving side and the driven side of the clutch 144, a friction clutch may be required to be used as the clutch 144. However, in the latter case, it is possible to transmit a rotation angle accurately by use of a tooth-shaped clutch having triangular teeth or the like as the clutch 144.

Further, a sensor (not shown) to detect a phase of the non-circular gear pair 18 is provided, and a detection signal is input to a control device (not shown). Thereby, the control device is capable of operating the actuator for the clutches 40, 42, and 44 in accordance with a phase of the non-circular gear pair 18 after the clutch 144 is made into an ON-state, to perform the control for switching the reduction ratio.

Embodiment 2

Embodiment 2 will be described with reference to FIGS. 8 and 9.

Figure 8:
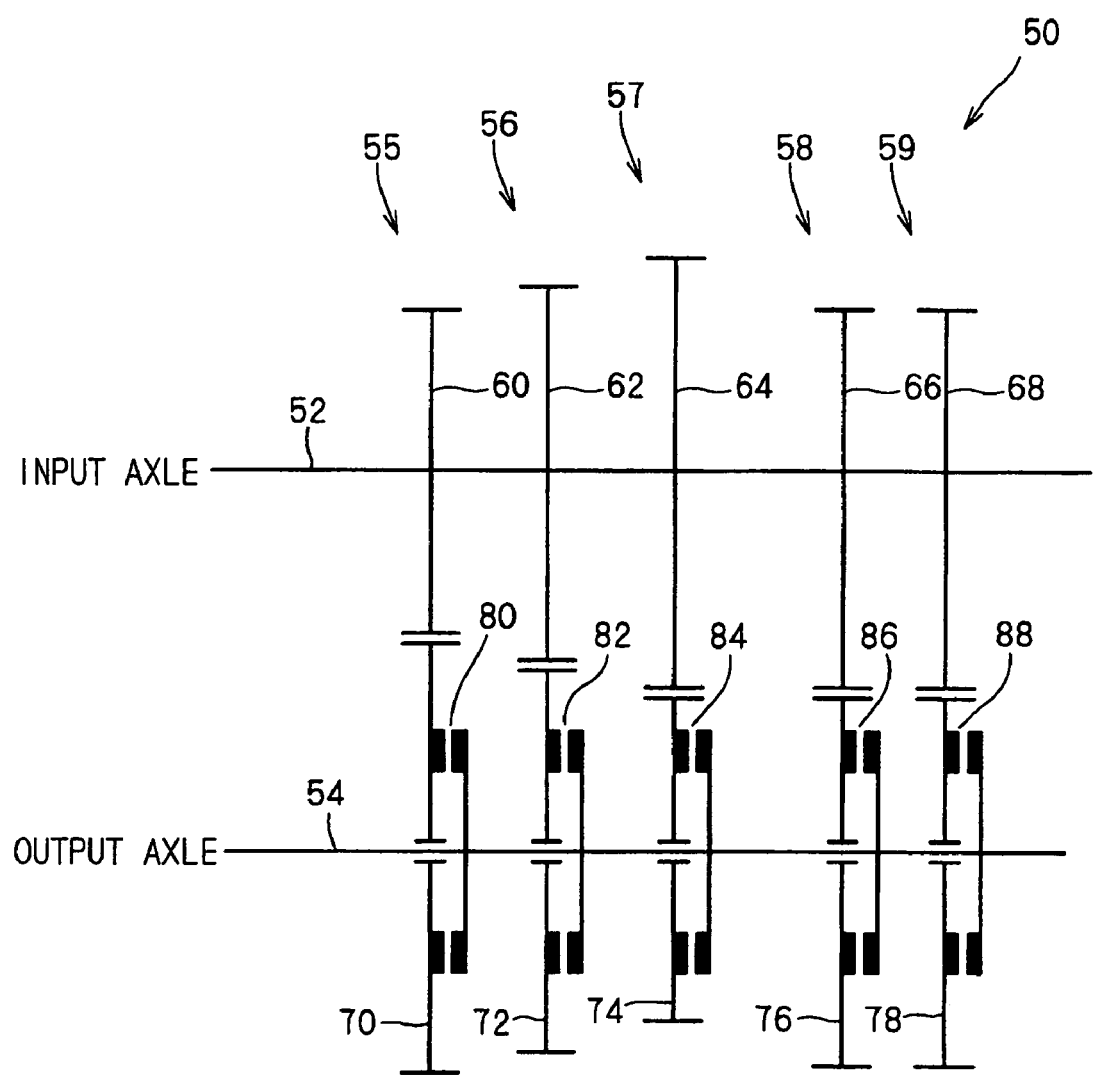
FIG. 8 is a structural chart schematically showing a configuration of a transmission. (Embodiment 2)

As schematically shown in a structural chart of FIG. 8, a transmission 50 in Embodiment 2 includes an input axle 52, an output axle 54, a first gear pair 55, a second gear pair 56, a third gear pair 57, a first non-circular gear pair 58, a second non-circular gear pair 59, and clutches 80, 82, 84, 86, and 88. The reduction ratios of the first to third gear pairs 55, 56, and 57 are respectively $R_1$, $R_2$, and $R_3$, where those are $R_1 > R_2 > R_3$.

In the respective gear pairs 55 to 59, the pairs of gears 60 and 70, 62 and 72, 64 and 74, 66 and 76, and 68 and 78 respectively mesh together.

One of the gears (input side gears) 60, 62, 64, 66, and 68 of the respective gear pairs 55 to 59 are fixed to the input axle 52, and the input side gears 60, 62, 64, 66, and 68 rotate integrally with the input axle 52.

The other of the gears (output side gears) 70, 72, 74, 76, and 78 of the respective gear pairs 55 to 59 are supported to be in a relatively rotatable state by the output axle 54. The output side gears 70, 72, 74, 76, and 78 are connected to the output axle 54 so as to be releasable by clutches 80, 82, 84, 86, and 88. That is, when the clutches 80, 82, 84, 86, and 88 are engaged, that is in an ON-state, the corresponding output side gears 70, 72, 74, 76, and 78 are connected to the output axle 54, and the connected output side gears 70, 72, 74, 76, and 78 and the output axle 54 rotate integrally. When the clutches 80, 82, 84, 86, and 88 are disengaged, that is, in an OFF-state, the output side gears 70, 72, 74, 76, and 78 are restrained from moving in the axial direction of the output axle 54, to be made relatively rotatable with respect to the output axle 54.

Figure 9:
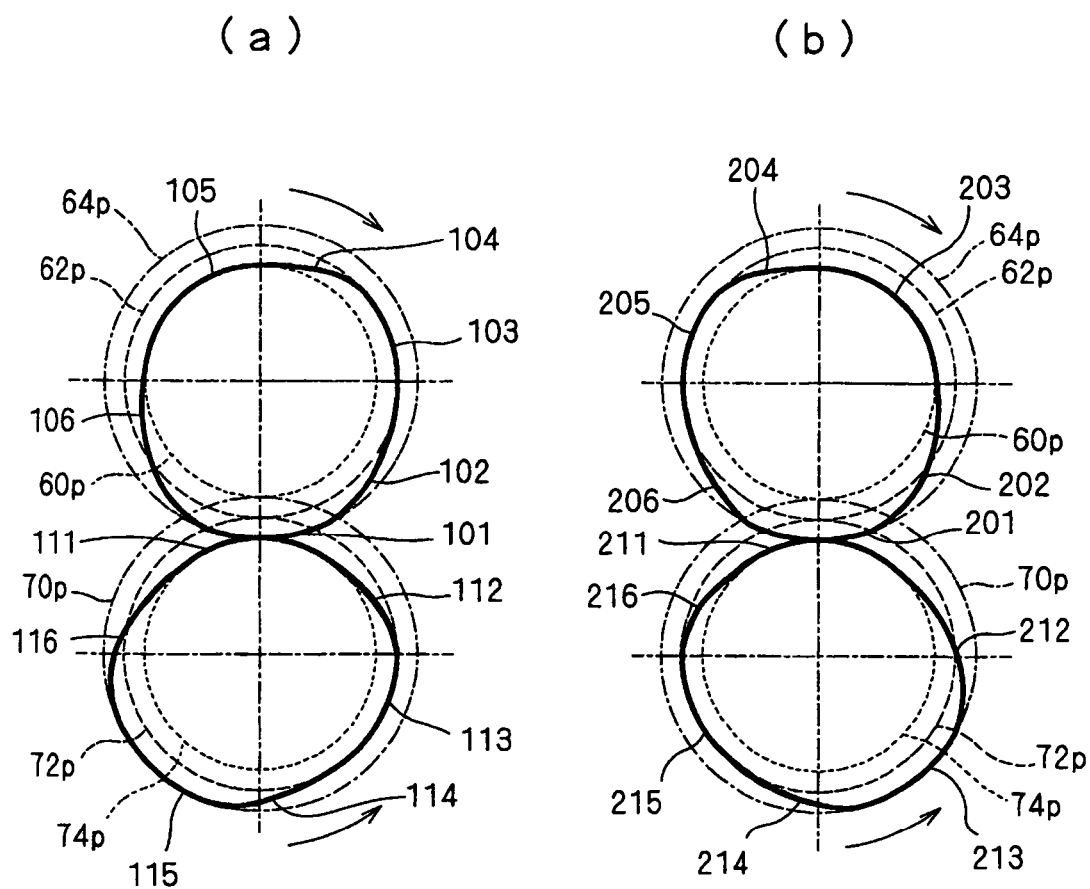
FIG. 9 are views schematically showing pitch circles or pitch curves of gears of the transmission. (Embodiment 2)

As schematically shown in FIG. 9, if the gears 60 and 70, 62 and 72, 64 and 74, 66 and 76, and 68 and 78 of the respective gear pairs 55, 56, 57, 58, and 59 are expressed in pitch circles or pitch curves, and illustrations of the faces of teeth are omitted, the first to third gear pairs 55, 56, and 57 are circular gears whose pitch circles 60p and 70p, 62p and 72p, and 64p and 74p of the paired gears 60 and 70, 62 and 72, and 64 and 74 contact each other.

The paired gears 66 and 76 of the first non-circular gear pair 58 are non-circular gears. As shown in FIG. 9A, the pitch curves of the paired gears 66 and 76 have a first section 101 and 111 which is equal to the circular arcs of the pitch circles 64p and 74p of the third gear pair 57 with the reduction ratio $R_3$, a third section 103 and 113 which is equal to the circular arcs of the pitch circles 62p and 72p of the second gear pair 56 with the reduction ratio $R_2$, a fifth section 105 and 115 which is equal to the circular arcs of the pitch circles 60p and 70p of the first gear pair 55 with the reduction ratio $R_1$, a second section 102 and 112 in which the reduction ratio changes between $R_3$ and $R_2$, a fourth section 104 and 114 in which the reduction ratio changes between $R_2$ and $R_1$, and a sixth section 106 and 116 in which the reduction ratio changes between $R_1$ and $R_3$. When the first non-circular gear pair 58 rotates in a direction shown by the arrows in FIG. 9A, the gears mesh together in the order of the respective sections 101 and 111, 102 and 112, 103 and 113, 104 and 114, 105 and 115, and 106 and 116. That is, the reduction ratio of the first non-circular gear pair 58 repeats a state of changing as $R_3 \to R_2 \to R_1$.

The paired gears 68 and 78 of the second non-circular gear pair 59 are non-circular gears. As shown in FIG. 9B, the pitch curves of the gears 68 and 78 have a first section 201 and 211 which is equal to the circular arcs of the pitch circles 64p and 74p of the third gear pair 57 with the reduction ratio $R_3$, a third section 203 and 213 which is equal to the circular arcs of the pitch circles 60p and 70p of the first gear pair 55 with the reduction ratio $R_1$, a fifth section 205 and 215 which is equal to the circular arcs of the pitch circles 62p and 72p of the second gear pair 56 with the reduction ratio $R_2$, a second section 202 and 212 in which the reduction ratio changes between $R_3$ and $R_1$, a fourth section 204 and 214 in which the reduction ratio changes between $R_1$ and $R_2$, and a sixth section 206 and 216 in which the reduction ratio changes between $R_2$ and $R_3$. When the second non-circular gear pair 59 rotates in a direction shown by the arrows in FIG. 9B, the gears mesh together in the order of the respective sections 201 and 211, 202 and 212, 203 and 213, 204 and 214, 205 and 215, and 206 and 216. That is, the reduction ratio of the second non-circular gear pair 59 repeats a state of changing as $R_3 \to R_1 \to R_2$.

The first non-circular gear pair 58 is used for a case in which the reduction ratio is switched from $R_3$ to $R_2$ and a case in which the reduction ratio is switched from $R_2$ to $R_1$. In a case in which the reduction ratio is switched from $R_3$ to $R_1$, for example, first, the reduction ratio is switched from $R_3$ to $R_2$, and next, the reduction ratio is switched from $R_2$ to $R_1$.

For example, in a case in which the reduction ratio is switched from $R_3$ to $R_2$, in a state in which the clutch 84 of the third gear pair 57 with the reduction ratio $R_3$ is in an ON-state, when the meshing thereof passes through the sixth section 106 and 116 in which the reduction ratio of the first non-circular gear pair 58 changes from $R_1$ to $R_3$ to enter into the first section 101 and 111 in which the reduction ratio becomes the constant reduction ratio $R_3$, the clutch 86 of the first non-circular gear pair 58 is made into an ON-state in addition to the clutch 84 of the third gear pair 57 with the reduction ratio $R_3$. Then, after the clutch 86 of the first non-circular gear pair 58 becomes an ON-state in the first section 101 and 111, and before the meshing thereof enters into the second section 102 and 112 in which the reduction ratio of the first non-circular gear pair 58 changes from $R_3$ to $R_2$, the clutch 84 of the third gear pair 57 with the reduction ratio $R_3$ is made into an OFF-state. Thereafter, in the second section 102 and 112 in which the reduction ratio of the non-circular gear pair 58 changes from $R_3$ to $R_2$, only the clutch 86 of the first non-circular gear pair 58 is in an ON-state.

When the meshing of the first non-circular gear pair 58 passes through the second section 102 and 112 to enter into the third section 103 and 113 in which the reduction ratio becomes the constant reduction ratio $R_2$, the clutch 82 of the second gear pair 56 with a reduction ratio of $R_2$ is made into an ON-state. Then, after the clutch 82 of the second gear pair 56 becomes an ON-state, and before the meshing thereof enters into the fourth section 104 and 114 in which the reduction ratio of the first non-circular gear pair 58 changes from $R_2$ to $R_1$, the clutch 86 of the first non-circular gear pair 58 is made into an OFF-state.

On the other hand, the second non-circular gear pair 59 is used for a case in which the reduction ratio is switched from $R_1$ to $R_2$ and a case in which the reduction ratio is switched from $R_2$ to $R_3$. In a case in which the reduction ratio is switched from $R_1$ to $R_3$, for example, first, the reduction ratio is switched from $R_1$ to $R_2$, and next, the reduction ratio is switched from $R_2$ to $R_3$.

In a case in which there is only one non-circular gear pair which has three or more sections in which the reduction ratio becomes a constant reduction ratio, whose reduction ratios are different, for example, when there is only the non-circular gear pair 58 without the non-circular gear pair 59 in FIG. 8, a process in which the reduction ratio changes as $R_2 \rightarrow R_1 \rightarrow R_3$ is required when the reduction ratio is changed from $R_2$ to $R_3$. Therefore, when the reduction ratio is changed while rotating the gears, an increase and a reduction in rotation speed are caused, which may be problematic in some cases. In contrast thereto, provided that the non-circular gear pairs 58 and 59 which are different from each other are used for a case in which the reduction ratio is increased and a case in which the reduction ratio is decreased as in FIGS. 8 and 9, it is possible to smoothly switch the reduction ratios in both cases.

One-way clutches can be used as some clutches. When it is assumed that a rotation in a certain direction is a forward direction rotation, a one-way clutch becomes an ON-state when the input side is going to rotate in the forward direction faster than the output side, to transmit the rotation at the input side to the output side, and the input side and the output side rotate at a same rotation speed. On the other hand, a one-way clutch becomes an OFF-state when the input side rotates in the forward direction slower than the output side, and the input side and the output side rotate at respective rotation speeds.

For example, a one-way clutch is used between the output side gears and the output member (output axle) of a gear element pair having a maximum reduction ratio. In this case, when the reduction ratio of the transmission is switched in a state in which the one-way clutch is in an ON-state, i.e., in a state in which the reduction ratio of the transmission is at a maximum, the reduction ratio is decreased. Therefore, the rotation speed of the output member is increased, the rotation of the output side is made faster than that of the input side of the one-way clutch, and the one-way clutch automatically becomes an OFF-state. In contrast thereto, in a case in which the reduction ratio of the transmission is maximized, the one-way clutch automatically becomes an ON-state at a stage at which the clutch for the non-circular gear element pair used for switching the rotation ratio is made into an OFF-state. Because the clutch for the gear element pair having a maximum reduction ratio is automatically switched ON and OFF, it is possible to simplify the clutch control.

With respect to a non-circular gear element pair, provided that a one-way clutch is series-connected to a main clutch that is capable of controlling to switch ON and OFF, the main clutch is made into an ON-state in advance, and the one-way clutch can be made to automatically an ON-state at an appropriate timing, or the main clutch can be made into an OFF-state after the one-way clutch becomes an OFF-state at an appropriate timing, which makes it easy to control timings for switching to ON and OFF of the clutches.

For example, as a non-circular gear element pair in which the reduction ratio changes between $R_H$ and $R_L$ ($R_H > R_L$), a non-circular gear element pair in which a one-way clutch is series-connected to a main clutch between the output side gears and an output member (output axle) is used.

In this case, after the reduction ratio of the transmission is switched from $R_H$ to $R_L$, i.e., after the main clutch of the non-circular gear element pair becomes an ON-state, the reduction ratio of the transmission changes from $R_H$ to $R_L$, and a clutch for a gear element pair with a reduction ratio of $R_L$ becomes an ON-state, even if a timing in which the main clutch for the non-circular gear element pair is made into an OFF-state is delayed, when the reduction ratio of the non-circular gear element pair becomes greater than $R_L$, the one-way clutch for the non-circular gear element pair automatically becomes an OFF-state. Accordingly, when the reduction ratio is switched from $R_H$ to $R_L$, it is easy to control for making the main clutch for the non-circular gear element pair become an OFF-state.

When the reduction ratio of the transmission is switched from $R_L$ to $R_H$, even if a timing in which the main clutch for the non-circular gear element pair is made into an ON-state is too early, and the main clutch of the non-circular gear element pair becomes an ON-state when the reduction ratio of the non-circular gear element pair is not $R_L$, the one-way clutch automatically becomes an OFF-state. Thereafter, when the reduction ratio of the non-circular gear element pair becomes $R_L$, and the clutch for the gear element pair with a reduction ratio of $R_L$ is made into an OFF-state, the one-way clutch automatically becomes an ON-state. Accordingly, when the reduction ratio is switched from $R_L$ to $R_H$, it is easy to control for making the main clutch for the non-circular gear element pair become an ON-state.

The above-described configuration in which a one-way clutch is provided may be combined. For example, the transmission may be configured such that a one-way clutch is used between output side gears and an output member (output axle) of a gear element pair having a maximum reduction ratio, and a non-circular gear element pair in which a one-way clutch is series-connected to a main clutch that is capable of controlling to switch ON and OFF is connected between its output side gears and an output member (output axle) is used.

Note that, in a case in which the transmission has forward and backward two-way rotation direction, a bidirectional one-way clutch (for example, a clutch called two-way clutch, or the like) which is one type of one-way clutch may be used. For example, in a case in which the input side and the output side both rotate in the forward direction and in a case in which both rotate in the backward direction, a certain type of bidirectional one-way clutch becomes an ON-state when an absolute value of a rotation speed at the input side is going to be greater than an absolute value of a rotation speed at the output side, and the input side and the output side rotate at a same rotation speed. On the other hand, the one-way clutch becomes an OFF-state when an absolute value of a rotation speed at the input side is less than an absolute value of a rotation speed at the output side, and the input side and the output side rotate at respective rotation speeds.

Embodiment 3

Figure 11:
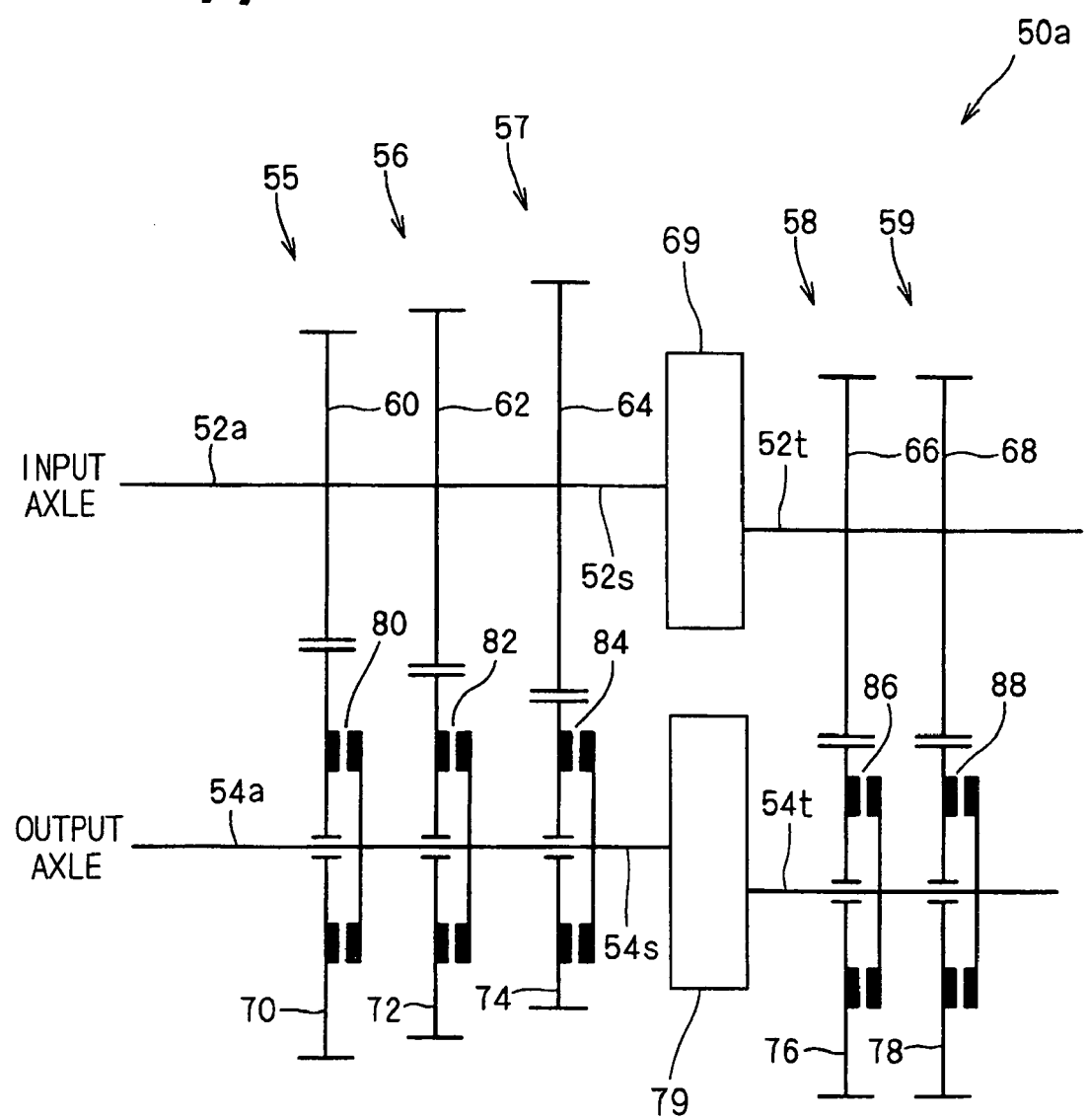
FIG. 11 is a structural chart schematically showing a configuration of a transmission. (Embodiment 3)

A transmission $50a$ of Embodiment 3 will be described with reference to FIG. 11.

The transmission $50a$ of Embodiment 3 is configured to be substantially the same as the transmission $50$ of Embodiment 2. Hereinafter, points different from Embodiment 2 will be mainly described, and the same components are denoted by the same reference numerals and letters.

In the transmission $50a$ of Embodiment 3, speed-up and reduction gear devices $69$ and $79$ are provided between the first to third gear pairs $55$, $56$, and $57$ and the first and second non-circular gear pairs $58$ and $59$.

That is, an input axle $52a$ and an output axle $54a$ are divided into first portions $52s$ and $54s$ in which the first to third gear pairs $55$, $56$, and $57$ are arranged, and second portions $52t$ and $54t$ in which the first and second non-circular gear pairs $58$ and $59$ are arranged, and the first portions $52s$ and $54s$ and the second portions $52t$ and $54t$ are connected so as to be capable of transmitting rotation via the speed-up and reduction gear devices $69$ and $79$.

Here, the reduction ratio of the input side speed-up and reduction gear device $69$ is defined as $N_{i1}/N_{i2}$ by use of a rotation speed $N_{i1}$ of the first portion $52s$ in the input axle $52a$ and a rotation speed $N_{i2}$ of the second portion $52t$ in the input axle $52a$. The reduction ratio of the output side speed-up and reduction gear device $79$ is defined as $N_{o2}/N_{o1}$ by use of a rotation speed $N_{o2}$ of the second portion $54t$ in the output axle $54a$ and a rotation speed $N_{o1}$ of the first portion $54s$ in the output axle $54a$. It is necessary to pay attention to the point that the definition of the reduction ratio of the output side speed-up and reduction gear device $79$ is not $N_{o1}/N_{o2}$.

For example, the rotation speeds at the side of the non-circular gear pairs $58$ and $59$ can be made slower by the speed-up and reduction gear devices $69$ and $79$. That is, the reduction ratio of the input side speed-up and reduction gear device $69$ provided between the first portion $52s$ and the second portion $52t$ in the input axle $52a$ is made into $R_0$, to make a rotation speed of the second portion $52t$ of the input axle $52a$ slower than a rotation speed of first portion $52s$ in the input axle $52a$, and the reduction ratio of the output side speed-up and reduction gear device $79$ provided between the second portion $54t$ and the first portion $54s$ in the output axle $54a$ is made into $1/R_0$, to make a rotation speed of the second portion $54t$ in the output axle $54a$ slower than a rotation speed of the first portion $54s$ in the output axle $54a$. Thereby, the rotation speeds at the side of the non-circular gear pairs $58$ and $59$ are made slower. Thereby, even if a rotation of the first portion $52s$ in the input axle $52a$ is at a high speed, in the same way as in Embodiment 2, it is possible to transmit the rotation while changing a reduction ratio by the meshing at the side of the non-circular gear pairs $58$ and $59$. Note that speed-up and reduction gear devices having the same configuration may be used as the speed-up and reduction gear devices $69$ and $79$, and a speed may be reduced in one device and a speed may be increased in the other device.

It is possible to increase the rotation speeds at the side of the non-circular gear pairs $58$ and $59$ by the speed-up and reduction gear devices $69$ and $79$.

Because it suffices to switch the reduction ratio of the transmission $50a$ as a whole by the speed-up and reduction gear devices $69$ and $79$ and the first and second non-circular gear pairs $58$ and $59$, a reduction ratio $R_{in}$ of the speed-up and reduction gear device $69$ provided at the side of the input axle $52a$ and a reduction ratio $R_{out}$ of the speed-up and reduction gear device $79$ provided at the side of the output axle $54a$ may not be necessarily $R_{in} \times R_{out} = 1$.

For example, given that a reduction ratio of the first gear pair $55$ is $R_1$, a reduction ratio of the second gear pair $56$ is $R_2$, a reduction ratio in a certain section of the first non-circular gear pair $58$ is $R_1'$, and a reduction ratio in another section of the first non-circular gear pair $58$ is $R_2'$, in order to be able to switch the reduction ratio of the transmission $50a$ from $R_1$ to $R_2$, or from $R_2$ to $R_1$, it suffices to satisfy the following two formulas.

$$R_1 = R_{in} \times R_1' \times R_{out}$$

$$R_2 = R_{in} \times R_2' \times R_{out}$$

In the transmissions in Embodiments 1 and 2, when an input is at a high speed rotation, a time required for the operation of switching the clutches is shortened, which makes it difficult to switch the reduction ratio in some cases. Further, the reduction ratio rapidly changes, which may bring about great impact in some cases.

In contrast thereto, in the transmission $50a$ in Embodiment 3, even when an input is at a high speed rotation, a time required for the operation of switching the clutches can be lengthened by making the rotations of the non-circular gear pairs $58$ and $59$ slower by the speed-up and reduction gear devices $69$ and $79$ with appropriate reduction ratios, which makes it possible to easily change the reduction ratio. Further, it is possible to ease a rapid change in the reduction ratio, which makes it possible to reduce impact.

In contrast thereto, when an input is a low speed rotation, a time required for switching a reduction ratio can be shortened by making the rotations of the non-circular gear pairs $58$ and $59$ faster by the speed-up and reduction gear devices $69$ and $79$ with appropriate reduction ratios.

Further, it is also possible to improve design and selection freedom of the non-circular gear pairs $58$ and $59$ and the speed-up and reduction gear devices $69$ and $79$.

<Summary> As described above, in accordance with use of the transmission and the gear changing method of the present invention, it is possible to change a reduction ratio while a load is supported without stopping rotation, and transmitting a rotation angle accurately and transmitting power efficiently. In accordance with use of the transmission and the gear changing method of the present invention, because it is possible to transmit power efficiently when a reduction ratio is changed, and continue supporting a load, the transmission and the gear changing method of the present invention are suitable for, for example, driving systems for bicycles, automobiles, motorcycles, and the like. Further, because it is possible to transmit a rotation angle accurately, the transmission and the gear changing method of the present invention are suitable for, for example, driving systems required to precisely control a rotation angle, which are for robots, machine tools, and the like.

Note that the present invention is not limited to the above-described embodiments, various modifications may be applied thereto, to be carried out.

For example, clutches may be provided at the input axle side. In a case in which clutches are provided at the input axle side when reducing a speed, it is preferable in the point that clutches with torque capacities less than those in a case in which clutches are provided at the output axle side, can be used. Or, a clutch may be provided at the output axle side or at the input axle side for each gear pair. Further, clutches may be provided at both of the output axle side and the input axle side.

Clutches of types except for dog clutches may be used as clutches. Clutches such as electromagnetic clutches in which the clutches and an actuator are integrated, may be used. Clutches using electrorheological fluid or clutches using magnetorheological fluid may be used.

As non-circular gear element pairs, not only non-circular gear element pairs whose reduction ratios gradually change with respect to rotations, but also non-circular gear element pairs whose reduction ratios rapidly change may be used.

In order to reduce vibration due to unbalanced mass of the non-circular gear element pairs, a balance weight may be attached.

Further, the reduction ratio of the transmission may be another number except for 1. Because the non-circular gear element pairs are required to mesh with each other, the reduction ratio can be an integer, for example, 2, 3, 4, 5, 6, 7, . . . , or the like. In this case as well, meshing clutches such as dog clutches may be used. The transmission of the present invention can be used, not only when reducing a speed, but also when increasing a speed, i.e., for a case in which a rotation speed of the output axle is higher than that of the input axle. In this case as well, meshing clutches such as dog clutches may be used.

Further, in a case in which three sets of gear element pairs and two sets of non-circular gear element pairs are used, differently from Embodiment 2, the transmission may be configured such that, for example, the first non-circular gear element pair has a meshing section in which the reduction ratio becomes a low reduction ratio and a medium reduction ratio, and the second non-circular gear element pair has a meshing section in which the reduction ratio becomes a high reduction ratio and a medium reduction ratio, and when a reduction ratio is changed from the low reduction ratio to the medium reduction ratio, and from the medium reduction ratio to the low reduction ratio, the first non-circular gear element pair is used, and when the reduction ratio is changed from the high reduction ratio to the medium reduction ratio, and from the medium reduction ratio to the high reduction ratio, the second non-circular gear element pair is used.

Further, in a case of a transmission in which the five reduction ratios of a first gear speed, a second gear speed, a third gear speed, a fourth gear speed, and a fifth gear speed (where the reduction ratios become lower in the order of the first gear speed, the second gear speed, the third gear speed, the fourth gear speed, and the fifth gear speed. That is, the first gear speed is the highest reduction ratio and the fifth gear speed is the lowest reduction ratio) are switched, for example, when the transmission rotates in a certain direction, a first non-circular gear element pair whose reduction ratio changes in the order of the first gear speed, the second gear speed, and the third gear speed, a second non-circular gear element pair whose reduction ratio changes in the order of the third gear speed, the second gear speed, and the first gear speed, a third non-circular gear element pair whose reduction ratio changes in the order of the third gear speed, the fourth gear speed, and the fifth gear speed, and a fourth non-circular gear element pair whose reduction ratio changes in the order of the fifth gear speed, the fourth gear speed, and the third gear speed, may be used. Or, a first non-circular gear element pair whose reduction ratio changes between the first gear speed and the second gear speed, a second non-circular gear element pair whose reduction ratio changes between the second gear speed and the third gear speed, a third non-circular gear element pair whose reduction ratio changes between the third gear speed and the fourth gear speed, and a fourth non-circular gear element pair whose reduction ratio changes between the fourth gear speed and the fifth gear speed, may be used. Moreover, when the transmission rotates in a certain direction, a first non-circular gear element pair whose reduction ratio changes in the order of the first gear speed, the second gear speed, the third gear speed, the fourth gear speed, and the fifth gear speed, and a second non-circular gear element pair whose reduction ratio changes in the order of the fifth gear speed, the fourth gear speed, the third gear speed, the second gear speed, and the first gear speed, may be used.

In a case in which input side and output side speed-up and reduction gear devices are provided between the first portion and the second portion in the input member and the output member, if there is only one set of a non-circular gear element pair, the non-circular gear element pair-use clutches may be provided, not only between the second portion in the input member or the output member and the non-circular gear element pair, but also between the input side or output side speed-up and reduction gear device and the second portion in the input member or the output member, in the input side or output side speed-up and reduction gear device, between the input side or output side speed-up and reduction gear device and the first portion in the input member or the output member, and the like.

The invention claimed is:

1. A transmission comprising:
a first gear element pair and a second gear element pair which are at least two sets of gear element pairs, the first gear element pair and the second gear element pair are respectively arranged between an input member and an output member supported rotatably;
a first clutch and a second clutch which are at least two sets of clutches, the first clutch and the second clutch respectively couple at least two sets of the gear element pairs releasably between the input member and the output member;
at least one set of a non-circular gear element pair which is arranged between the input member and the output member; and
at least one set of a non-circular gear element pair-use clutch that couples at least one set of the non-circular gear element pair releasably between the input member and the output member, wherein
the non-circular gear element pair includes a first meshing section in which a reduction ratio between the input member and the output member becomes equal to a first reduction ratio in at least a partial meshing section of the first gear element pair when the first gear element pair is coupled between the input member and the output member, and a second meshing section in which a reduction ratio between the input member and the output member becomes equal to a second reduction ratio in at least a partial meshing section of the second gear element pair when the second gear element pair is coupled between the input member and the output member.

2. The transmission according to claim 1, comprising:
at least three sets of the gear element pairs;
at least three sets of the clutches;
at least two sets of the non-circular gear element pairs; and
at least two sets of the non-circular gear element pair-use clutches.

3. The transmission according to claim 1, wherein the gear element pair comprises a pair of circular gear elements which mesh with each other.

4. The transmission according to claim 1, wherein
one of the gear elements of the gear element pair is supported to be in a relatively rotatable state by one of the input member and the output member,
the other one of the gear elements of the gear element pair is fixed not to be in a relatively rotatable state to the other one of the input member and the output member,
the clutch connects one of the gear elements of the gear element pair releasably to one of the input member and the output member,
one of the non-circular gear elements of the non-circular gear element pair is supported to be in a relatively rotatable state by one of the input member and the output member,
the other one of the non-circular gear elements of the non-circular gear element pair is fixed not to be in a relatively rotatable state to the other one of the input member and the output member at least when the gear element pair coupled between the input member and the output member is switched,
the non-circular gear element pair-use clutch connects at least one of the non-circular gear elements of the non-circular gear element pair releasably to one of the input member and the output member, and
at least one of the clutch and the non-circular gear element pair-use clutch is a positive clutch.

5. The transmission according to claim 1, further comprising:
an actuator that respectively drives the clutch and the non-circular gear element pair-use clutch; and
a control device that controls operations of the actuator.

6. The transmission according to claim 1, wherein
slidingly-contact members are provided in parallel with the respective non-circular gear elements forming the non-circular gear element pair, and
the slidingly-contact members respectively rotate integrally with the respective non-circular gear elements, and outer circumferential surfaces thereof frictionally contact each other.

7. The transmission according to claim 1, wherein the non-circular gear element pair-use clutch is capable of simultaneously releasing both of a connection between the input member and the non-circular gear element pair and a connection between the non-circular gear element pair and the output member.

8. A gear changing method for changing a reduction ratio between an input member and an output member rotating, the gear changing method comprising:
a first step of coupling a non-circular gear element pair between the input member and the output member in a state in which a first (or second) gear element pair meshing with each other at a first (or second) reduction ratio in at least a partial meshing section is coupled between the input member and the output member in a situation where the non-circular gear element pair and the first (or second) gear element pair simultaneously mesh respectively at the first (or second) reduction ratio;
a second step of releasing the coupling of the first (or second) gear element pair between the input member and the output member while the non-circular gear element pair and the first (or second) gear element pair simultaneously continue meshing respectively at the first (or second) reduction ratio;
a third step of coupling a second (or first) gear element pair meshing with each other at a second (or first) reduction ratio in at least a partial meshing section between the input member and the output member, in a state in which the non-circular gear element pair meshes with each other at the second (or first) reduction ratio in a situation where the non-circular gear element pair and the second (or first) gear element pair simultaneously mesh respectively at the second (or first) reduction ratio; and
a fourth step of releasing the coupling of the non-circular gear element pair between the input member and the output member while the non-circular gear element pair and the second (or first) gear element pair simultaneously continue meshing respectively at the second (or first) reduction ratio.

9. The transmission according to claim 1, comprising:
an input side speed-up and reduction gear device that connects so as to be capable of transmitting rotation between a first portion in the input member in which one of the gear elements of the gear element pair is arranged and a second portion in the input member in which one of the non-circular gear elements of the non-circular gear element pair is arranged; and
an output side speed-up and reduction gear device that connects so as to be capable of transmitting rotation between a first portion in the output member in which the other one of the gear elements of the gear element pair is arranged and a second portion in the output member in which the other one of the non-circular gear elements of the non-circular gear element pair is arranged.

10. The transmission according to claim 1, wherein the clutch includes a one-way clutch.

11. The transmission according to claim 10, wherein the clutch that couples the gear element pair with a maximum reduction ratio among the gear element pairs releasably between the input member and the output member is a one-way clutch.

12. A transmission comprising:
a first gear element pair and a second gear element pair which are at least two sets of gear element pairs, the first gear element pair and the second gear element pair are respectively arranged between an input member and an output member supported rotatably;
a first clutch and a second clutch which are at least two sets of clutches, the first clutch and the second clutch respectively couple at least two sets of the gear element pairs releasably between the input member and the output member;
at least one set of a non-circular gear element pair which is arranged between the input member and the output member;
at least one set of a non-circular gear element pair-use clutch that couples at least one set of the non-circular gear element pair releasably between the input member and the output member;
an input side speed-up and reduction gear device that connects so as to be capable of transmitting rotation between a first portion in the input member in which one of the gear elements of the gear element pair is arranged and a second portion in the input member in which one of the non-circular gear elements of the non-circular gear element pair is arranged; and an output side speed-up and reduction gear device that connects so as to be capable of transmitting rotation between a first portion in the output member in which the other one of the gear elements of the gear element pair is arranged and a second portion in the output member in which the other one of the non-circular gear elements of the non-circular gear element pair is arranged, wherein the non-circular gear element pair includes a first meshing section in which a reduction ratio thereof becomes a first reduction ratio and a second meshing section in which a reduction ratio thereof becomes a second reduction ratio, a product of the first reduction ratio of the non-circular gear element pair, a reduction ratio of the input side speed-up and reduction gear device, and a reduction ratio of the output side speed-up and reduction gear device is equal to a reduction ratio in at least a partial meshing section of the first gear element pair when the first gear element pair is coupled between the input member and the output member, and a product of the second reduction ratio of the non-circular gear element pair, a reduction ratio of the input side speed-up and reduction gear device, and a reduction ratio of the output side speed-up and reduction gear device is equal to a reduction ratio in at least a partial meshing section of the second gear element pair when the second gear element pair is coupled between the input member and the output member.

\* \* \* \* \*